US007401194B2

(12) United States Patent
Jewell

(10) Patent No.: US 7,401,194 B2
(45) Date of Patent: Jul. 15, 2008

(54) DATA BACKUP SYSTEM AND METHOD

(75) Inventor: Timothy R. Jewell, Toronto (CA)

(73) Assignee: Acpana Business Systems Inc., Toronto (CA)

( * ) Notice: Subject to any disclaimer, the term of this patent is extended or adjusted under 35 U.S.C. 154(b) by 561 days.

(21) Appl. No.: 11/003,763

(22) Filed: Dec. 6, 2004

(65) Prior Publication Data

US 2005/0131990 A1   Jun. 16, 2005

Related U.S. Application Data

(60) Provisional application No. 60/526,610, filed on Dec. 4, 2003.

(51) Int. Cl.
*G06F 13/00* (2006.01)
(52) U.S. Cl. .................... 711/162; 711/161; 707/204
(58) Field of Classification Search .................. 711/162
See application file for complete search history.

(56) References Cited

U.S. PATENT DOCUMENTS 6,038,665 A * 3/2000 Bolt et al. ................... 713/176
6,324,654 B1 * 11/2001 Wahl et al. .................... 714/6
6,330,570 B1   12/2001 Crighton
6,651,077 B1   11/2003 East et al.
2003/0177149 A1 * 9/2003 Coombs .................... 707/204

* cited by examiner

*Primary Examiner*—Jasmine Song
(74) *Attorney, Agent, or Firm*—Bereskin & Parr; Isis E. Caulder

(57) ABSTRACT

A data backup system for backing up a data file from a source device having a source processor and an input device to a target device having a target processor and a database over a communication network. The source processor determines whether the data file has been modified, and if so, determines the modified data block(s). The modified data block(s) are transmitted from the source processor to the target processor over the communication network. The target processor receives the modified data block(s) from the source device over the communications network, and uses the modified data block(s) to construct the data file, and to store the data file on the database. Concurrently, it is determined if the input device is active at any time during the backup process, and if so, the backup processing is interrupted until the input device has been inactive for a predetermined period of time.

32 Claims, 19 Drawing Sheets

FIG. 11A

DATA BACKUP SYSTEM AND METHOD

This application claims the benefit under 35 U.S.C. 119(e) of U.S. Provisional Patent Application No. 60/526,610, filed Dec. 4, 2003.

FIELD OF THE INVENTION

This invention relates generally to the field of data backup systems and methods and more particularly to the backup of data associated with a remote or networked source device to a target device.

BACKGROUND OF THE INVENTION

The concept of backing up data file information stored on a computer is well known. Typically, computers within an organization are split into two categories, namely servers and personal workstations. Conventionally, an organization performs nightly tape backups of all of the data files stored on their servers. Employees who work on workstations that are networked to a central server using local area networks are instructed to keep all of their important data files on their server so that the important data files can be backed up by the nightly process. Even though employees are instructed to keep important data files on their server, it is also quite common for employees to keep important data files on their workstation hard drives. Employees who typically use laptop computers to work on data files when they are away from the office (i.e. not connected through the local area network) tend not to copy active data file to their server.

Though backup systems are available to backup data files on workstations, logistics and manual processes generally prevent these backups from being conducted on a regular basis. Typically, users are concerned about response time while working on documents and organization networks are not configured for backups while resources are being consumed by users. Backup solutions have been developed as alternatives to the conventional tape backup process. These solutions generally involve a scheduled backup that begins at a predetermined point in time. At this point a large amount of data is assembled and transported across a local area network to a server for storage. Since this solution requires the transfer of a large amount of data, they do not function well over a slow or intermittent Internet connection or during peak network operation.

Also, in the case of scheduled backups, a system administrator typically executes the backup application software and configures the software to run the backup job at a pre-determined time (e.g. every night at midnight) usually selected to ensure that the data to be backed up is not being utilized by anyone. The backup software sits idle until the pre-determined time and then initiates the backup. If there are impediments to completion of the backup (e.g. communications errors, connectivity problems, un-powered devices, hardware failures, etc.) then the backup will not be completed. The incomplete backup will be discovered by the administrator the next morning and accordingly, data remains unprotected until at least the following evening when the backup software is re-executed.

SUMMARY OF THE INVENTION

The invention provides in one aspect, a data backup system for backing up a data file from a source device having a source processor and an input device to a target device having a target processor over a communication network, said data backup system comprising:

(a) a backup source module for execution by the source processor of said source device, which when executed causes the source processor to:
   (i) determine whether the data file has been modified at the source device;
   (ii) if (i) is true then determine at least one modified data block associated with the modification to the data file;
   (iii) transmit the at least one modified data block from the source processor to the target processor over the communication network;

(b) a backup target module for execution by said target processor, which when executed causes the target processor to:
   (iv) receive said at least one modified data block from said backup source module over the communications network;

(c) said backup source module and said backup target module also for determining if the input device is active simultaneously with at least one of (i), (ii), (iii), and (iv), and if so, interrupt at least one of (i), (ii), (iii), and (iv), until the input device has been inactive for a predetermined period of time.

The invention provides in another aspect, a method for backing up a data file from a source device having a source processor and an input device to a target device having a target processor over a communication network, said method comprising:

(a) determining whether the data file has been modified at the source device;
(b) if (a) is true then determining at least one modified data block associated with the modification to the data file;
(c) transmitting the at least one modified data block from the source processor to the target processor over the communication network;
(d) receiving said at least one modified data block from said backup source module over the communications network;
(e) determining if the input device is active simultaneously with at least one of (a), (b), (c), and (d), and if so, interrupting at least one of (a), (b), (c), and (d), until the input device has been inactive for a predetermined period of time.

The invention provides in another aspect, a data backup system for backing up a data file from a source device having a source processor and an input device to a target device having a target processor over a communication network, said data backup system comprising:

(a) a backup source module for execution by the source processor of said source device, which when executed causes the source processor to:
   (i) determine whether the data file has been modified at the source device;
   (ii) if (i) is true then determine at least one modified data block associated with the modification to the data file;
   (iii) transmit the at least one modified data block from the source processor to the target processor over the communication network;

(b) a backup target module for execution by said target processor, which when executed causes the target processor to:
   (iv) receive said at least one modified data block from said backup source module over the communications network;

(c) a throttling module for execution by said source and target processors, which when executed causes the source and target processors to:

(v) control the transmission in (iii) and the reception in (iv) of data blocks such that only a set amount of bandwidth of communications network is utilized for the transmission in (iii) and the reception in (iv).

The invention provides in another aspect, a method for backing up a data file from a source device having a source processor and an input device to a target device having a target processor over a communication network, said method comprising:

(a) determining whether the data file has been modified at the source device;

(b) if (i) is true then determine at least one modified data block associated with the modification to the data file;

(c) transmitting the at least one modified data block from the source processor to the target processor over the communication network;

(d) receiving said at least one modified data block from said backup source module over the communications network;

(e) controlling the transmission in (c) and the reception in (d) of data blocks such that only a set amount of bandwidth of communications network is utilized for the transmission in (c) and the reception in (d).

Further aspects and advantages of the invention will appear from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show some examples of the present invention, and in which:

FIGS. 11A and 11B are screen captures of a graphical user interface (GUI) generated by the backup status module of data backup system of FIG. 1.

Figure 1:
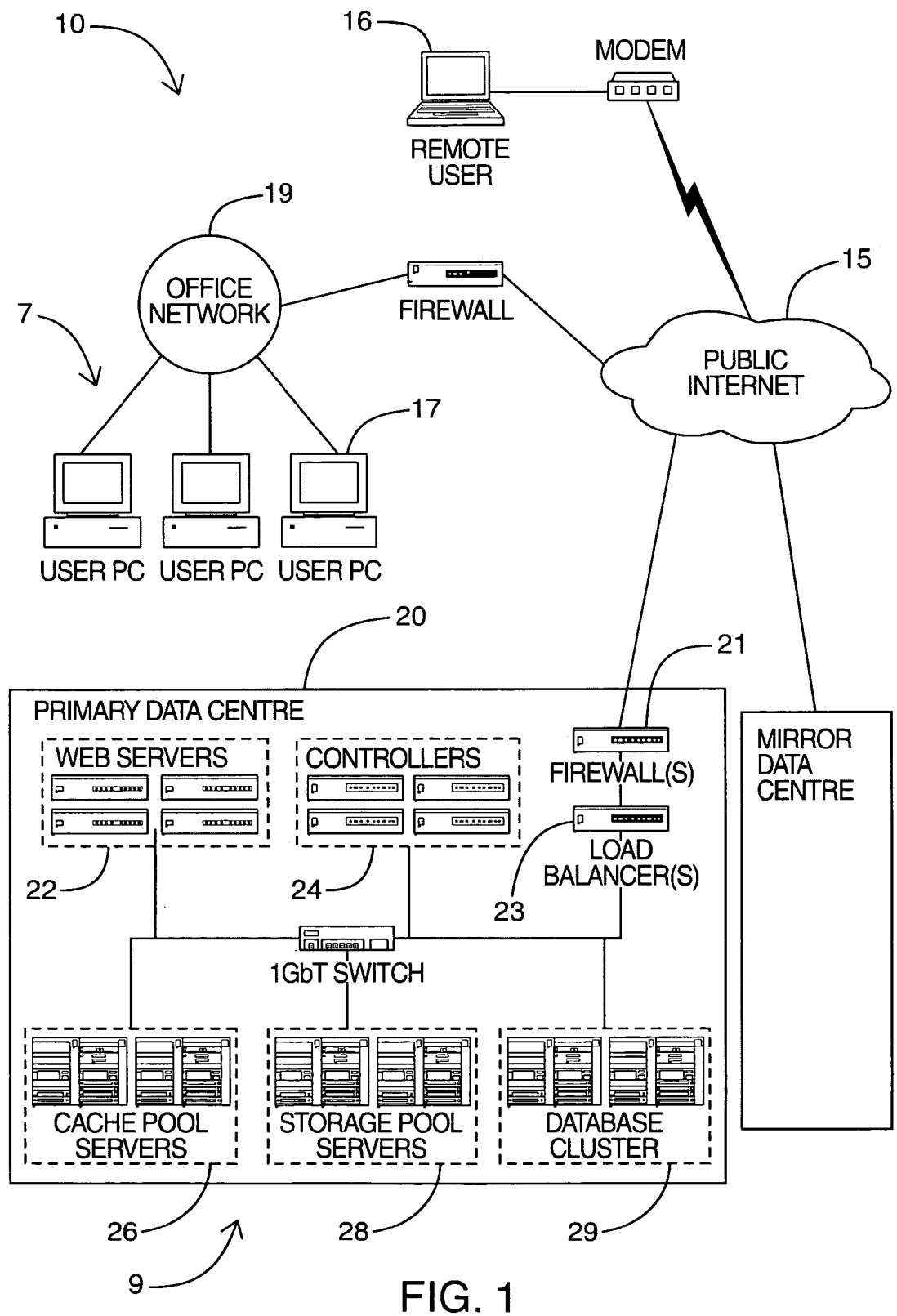
FIG. 1 is a block diagram of an example hardware implementation of the data backup system of the present invention.

It will be appreciated that for simplicity and clarity of illustration, elements shown in the figures have not necessary been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Reference is first made to FIGS. 1, 2A, 2B, and 3 that together illustrate the basic elements and processing stages of data backup system 10 made in accordance with a preferred embodiment of the present invention. Data backup system 10 uses a backup source program 12 installed on a source device 7 and a backup target program 14 installed on a target device 9 to backup a user's data file over a communications network 15 (e.g. public Internet connection).

Backup source program 12 is installed on a source device 7 such as a remote workstation 16 or networked workstation 17. It should be understood that source device 7 may be implemented by any wired or wireless personal computing device with input and display means (e.g. conventional personal computer, laptop computing device, personal digital assistant (PDA), wireless communication device, etc.) Backup target program 14 is installed on a target device 9 such as the controllers associated with a primary data center 20. Again, it should be understood that target device 9 may be implemented by any wired or wireless controller associated with a data storage device. For illustrative purposes only, data backup system 10 will be described with reference to the example data processing and communication environment shown in FIG. 1, namely a networked workstation 17 and the controllers associated with a primary data center 20.

Remote workstations 16 and networked workstations 17 connected through an office network 19 are coupled to primary data center 20 through a communications network 15 as shown in FIG. 1. Primary data center 20 includes web servers 22, controllers 24 cache pool servers 26, storage pool servers 28 and a database cluster 29. Primary data center 20 also includes a server firewall 51 and load balancers 53. As discussed, while for illustrative purposes, the communications network 15 will be considered to be a Internet-based communications network, it should be understood that communications network 15 could be any kind of communications network such as a wireless communications network, etc.

Figure 2A:
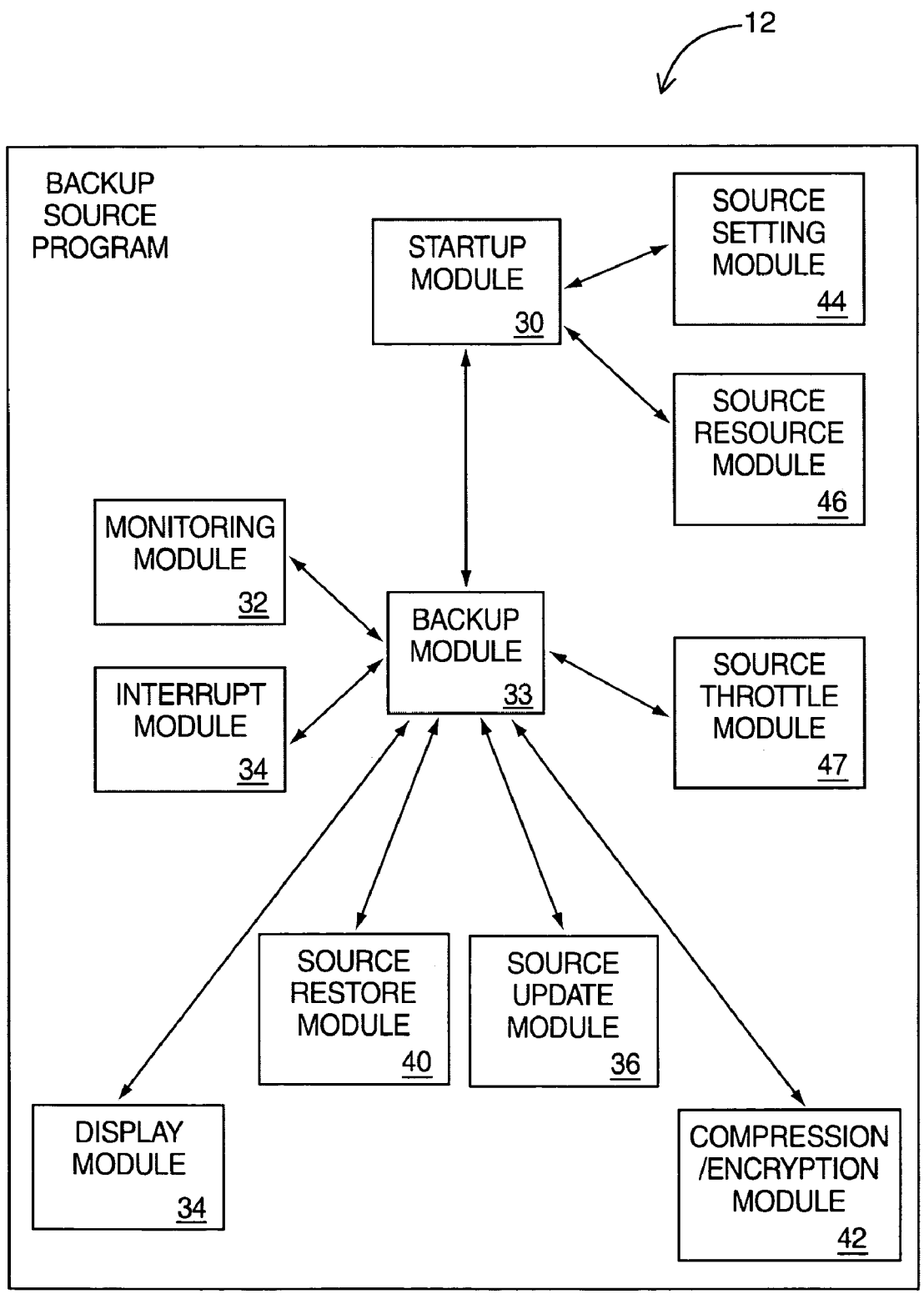
FIG. 2A is an illustrative block diagram of the backup source program that is executed by the remote and networked workstations of FIG. 1.
Figure 2B:
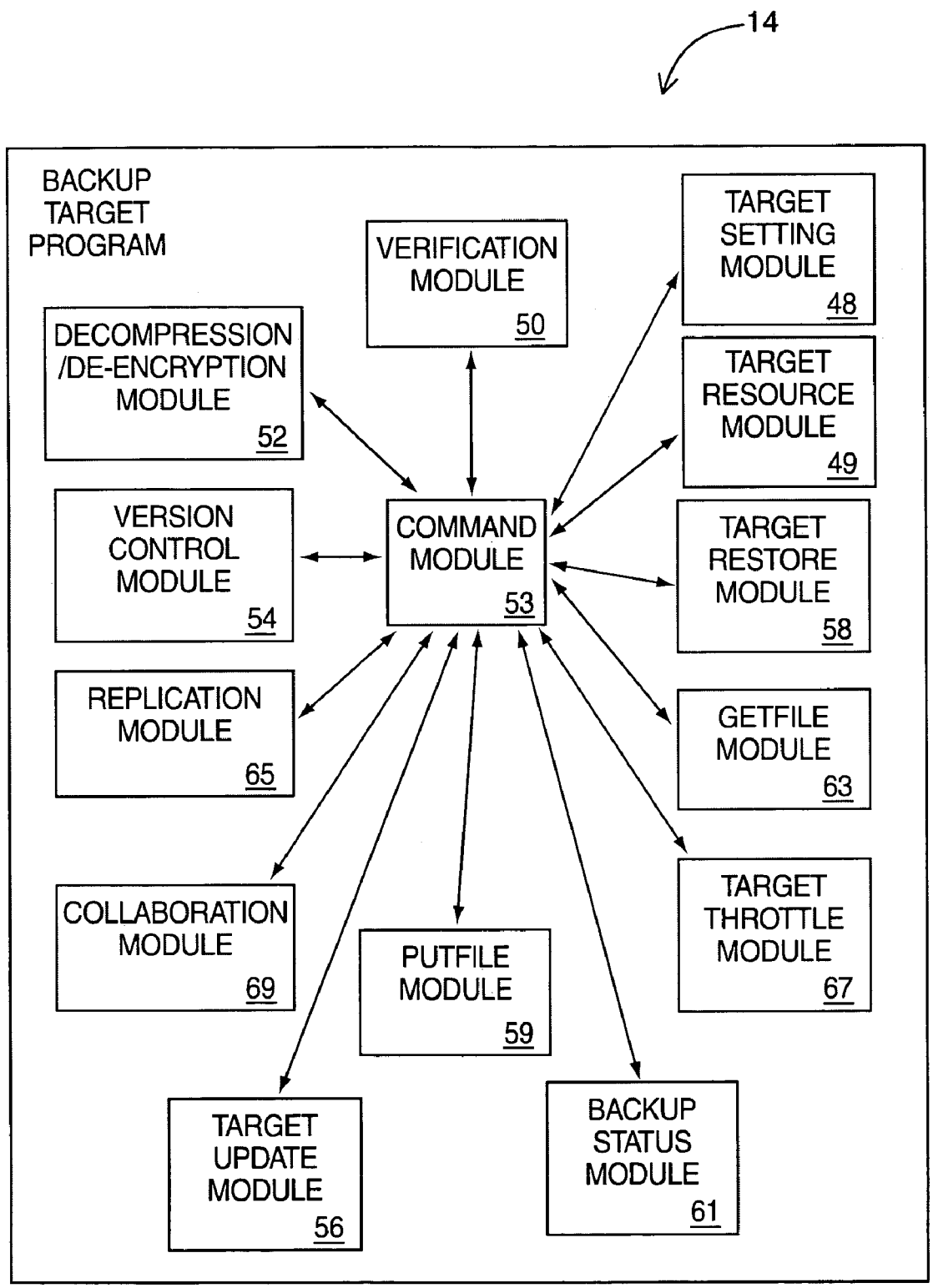
FIG. 2B is an illustrative block diagram of the backup target program that is executed by the controller server of the primary data center of FIG. 1.

Backup source program 12 includes a startup module 30 monitoring module 32, a backup module 33, an interrupt module 34, an source update module 36, a display module 38, a source restore module 40, a compression/encryption module 42, a source settings module 44, and a source resource module 46, a source throttle module 47 (FIG. 2A). Backup source program 12 is configured to operate either on a remote workstation 16 (e.g. a customer connected through a dial-up modem on the Internet 15) or on a networked workstation (e.g. an office employee networked through an office network 19 and the Internet 15). A user downloads backup source program 12 from a web site onto a remote or networked workstation 16 or 17. While it is preferred that backup source program 12 is run using a Windows™ based PC (e.g. Windows™ 95, Windows™ 98, Windows™ ME, Windows™ NT SP4 2000, XP or XP professional), it should be understood that backup source program 12 could be implemented using many other types of operating systems (e.g. Linux™). Also, it should be noted that users can login and access their data using a web browser (e.g. Microsoft™ Internet Explorer™ higher or Netscape™ or equivalent) through the web servers 22 of primary data center 20 (FIG. 2B). This feature is particularly suited to mobile users and allows mobile users to retrieve a data file by clicking on a web browser provided link. The user has the option to retrieve the file or a compressed (e.g. zipped) version of the file.

The user downloads backup source program 12 onto workstation, a small download of less than 5 MB. Once installed, the application occupies less than 10 MB on the client computer. Source settings module 44 allows the user to configure backup options according to personal preferences during the installation process. Source resource module 46 includes files that are required for user interaction (e.g. bitmaps of the main splash screen and branding images, dialog boxes, icons, menus, message strings, etc.) which are used by various modules within backup source program 12 including backup module 33, source restore module 40, a source settings module 44. Source settings module 44 allows the user to select backup parameters that are used by data backup system 10 to minimize the impact on bandwidth utilization. As will be discussed, the user can specify the maximum number of versions to be saved and the minimum ages between versions.

Also, source settings module 44 through display module 38 provides the user with two options for selecting the specific data files to be backed up. First, backup module 33 can automatically find data folders that should be backed up (e.g. Outlook™ e-mail folders) and display them through display module 38 to user. The user will then be able to review the selected data files and add/delete the data files and folders as necessary. Second, backup module 33 can allow a user to come up with which data files/folders that they would like backed up. Backup module 33 operates on the basis that backups are intended for user data files only and not for a complete hard drive backup (e.g. including system files, printer driver files, applications, etc.) An example screen interface 193 (FIG. 10B) is provided to the user on which the user can make such selections. Source settings module 44 also allows the user to operate via a proxy server or on the basis of web browser access.

Also, source settings module 44 through display module 38 provides the user with two options for selecting the specific data files to be backed up. First, backup module 33 can automatically find data folders that should be backed up (e.g. Outlook e-mail folders) and display them through display module 38 to user. The user will then be able to review the selected data files and add/delete the data files and folders as necessary. Second, backup module 33 can allow a user to come up with which data files/folders that they would like backed up. Backup module 33 operates on the basis that backups are intended for user data files only and not for a complete hard drive backup (e.g. including system files, printer driver files, applications, etc.) An example screen interface 193 (FIG. 10B) is provided to the user on which the user can make such selections. Source settings module 44 also allows the user to operate via a proxy server or on the basis of web browser access.

Once installed, data backup system 10 provides user workstation 16 or 17 with continuous backup service. Data backup system 10 monitors files, extracts changed data, and encrypts the changes locally for transmission to primary data center 20. Data backup system 10 also provide convenient restore functionality which allows the user to determine which version of a data file to restore as will be described. The continual nature of data backup system 10 reduces the possibility of forgotten backups the service is adapted to continuously run in the background without any user intervention. Also, as will be described, data backup system 10 does not interrupt a user's day-to-day computing activities because data files are only backed up when the user's computer is idle. If the user's workstation has a fast enough processor, the program settings within source settings module 44 can be altered to not suspend on user activity and backup source program 12 will then run continuously. In this mode, when a user saves a document, the data file is backed up in seconds.

Also, number of system defaults are built into the program to make utilization of the program more effective. For example, by default, backup source program 12 selects commonly used folders (e.g. "My Documents" folder, "Desktop" folder and Outlook™ related e-mail folders). Source update module 36 is used to download updates to backup source program 12. Since, backup module 33 loads many of the modules including the compression/encryption module 42, the source restore module 40, these files cannot be updated while backup module 33 is running. Accordingly, source update module 36 downloads the updated versions of these modules (marked as ".NEW") and overwrites the old modules once backup module 33 has stopped.

Backup target program 14 includes a verification module 50, a decompression/de-encryption module 52, a command module 53, a version control module 54, a target update module 56 a target restore module 58, a putfile module 59 and a replication module 60 (FIG. 2B). Backup target program 14 is installed on controllers 24 of primary data center 20. Controllers 24 are used to manage and direct the interaction between remote and networked workstations 16 and 17 having installed backup source programs 12. Backup source program 12 communicates with backup target program 14 within the controller layer. Web servers 22 are used to host the web administration interface. Controllers 24 and web servers 22 are preferably implemented within the Windows™ 2002/2003 operating system. Cache pool servers 26 are used to control the assembly of large incoming and outgoing files (e.g. files larger than 1 Mb). Storage pool servers 28 are configured to be intelligent storage pools and are used to maintain version control over the backed up data, to clean-up deleted files, to verify data as well as to move large files to and from cache pool servers 26. Database cluster 29 is used to maintain the directory structure, usage data and user file meta-data. Database cluster 29 is clustered for database failover as is conventionally known. Also, it is preferred that any ODBC compliant database be utilized. It should be noted that the web server 22, cache pool servers 26, and storage pool servers 28 are all preferably implemented within the Windows™ 2003 operating system.

Backup target program 14 also provides synchronization and monitoring features within data backup system 10. Specifically, the target device 9 periodically (e.g. every 5 minutes) polls an external device (i.e. a device that is providing backup support) to see whether any program updates are available. If so, then the backup functionality of target device 9 is shut down and the program updates are downloaded to the target device 9. Once the program updates are complete, the backup functionality of the target device 9 is restarted. Also, the target provides monitoring functionality for data backup system 10 by periodically simulating a connection attempt by a source device 7. If the connection attempt fails then within a predetermined period of time (e.g. 5 minutes), the target device 9 attempts a stop and restart operation in order to "restart" operation of target device 9.

Backup target program 14 is designed to scale horizontally. That is, the server architecture has been designed to be modular so that various processing modules can all run on a single target device 9 or can be distributed across many target devices 9 to add redundancy and spread the workload. Data backup system 10 utilizes a multilevel architecture where additional nodes can be added at each level to scale horizontally. It is anticipated that an unlimited number of storage pool servers 28 can be supported within primary data center 20. It should be noted that the main constraint is the size of database cluster 29 since it is anticipated that the database will grow at approximately 1 Mb per user or 1 Tb per million users.

Referring now to FIGS. 1, 2A, 2B, and 3, the general operation steps 100 of data backup system 10 will now be described. At step (101), startup module 30 (FIG. 2A) is called either by the user to start backup client 12 program. User is required to confirm that an initial data file upload may occur to primary data center 20. The initial upload occurs during the initial setup or it can be scheduled to occur when the user is connected to primary data center 20 through communication network 15 (i.e. when the user is connected through an Internet service provider). Until the initial upload is performed, the user will be alerted at each boot up of the computer to upload their backup data files. An estimate of the length of time for initial upload and typical incremental backups are provided to the user. If a connection is not maintained throughout the initial upload process, an autodialer will continue to call and backup remaining files until the backup is complete. Timed out backups will also be resumed at the point of time out. Going forward, only changes in data files not already backed up will be transmitted from workstation 16 or 17 to primary data center 20. It should be understood that startup module 30 also works in tandem with source update module 36 to enable automatic updates. Startup module 30 waits for backup module 33 to stop and then signals source update module 36 to begin downloaded updates to backup source program 12. Startup module 30 may or may not request for rebooting (e.g. to apply a new driver).

At step (102), monitoring module 32 of backup source program 12 monitors designated portions of the data file system on remote or networked workstation 16, 17 looking for changes to data files. At step (104), it is determined whether a change has been detected. If not, then at step (102), monitoring module 32 continues to monitor for changes. Depending on which specific monitoring mode parameters are selected by the user using source settings module 44, monitoring module 32 conducts its monitoring function both on a polling basis or on a real time basis. On a polling basis, the data files are inspected every n seconds where n is a relatively small number (e.g. 300 seconds). On a real time basis, the workstation operating system informs the backup source program 12 within milliseconds of a modification to a data file.

If a change is detected, then at step (106), backup module 33 determines which specific blocks of data have changed in each data file. Changed files are compared to the previous version and a binary difference file is created which contains the actual changes to the file. Block level changes are computed on changed files and only the changed data is saved for a new version. Block size can be any predetermined (e.g. 4 kb) or variable value. This allows for the backing up of a large file by saving only a few kilobytes of data that makes data backup system 10 efficient by minimizing the amount of backup data to be transferred to primary data center 20. Regardless of whether data files are inspected on polling or a real time basis, modified data blocks are backed up according to parameters that are set by the user, again, using source settings module 44. Parameters include the minimum data file age before a first backup, the minimum length of time between versions, and the maximum number of versions to be kept. Backup module 33 will not backup a data file until the data file reaches the minimum age set by the user (or by default). Also, backup module 33 will not backup a data file until the minimum time between versions has passed. When a data file exceeds the maximum number of versions, a target update module 56 within backup target program 14 combines the original file as stored within database cluster 29 of primary data center 20 with the stored modified data blocks (also stored in database cluster 29) to the data file to create a new up-to-date database file as will be described. When a modification in the data file is detected, backup module 33 scans for and computes all of the modification data blocks.

At step (108), compression/encryption module 42 compresses and encrypts the data blocks that have been determined to have been modified. Compression is accomplished using conventional zip compatible programs. Compressed data is then encrypted using 448 bit Blowfish encryption before being sent from workstation 16 or 17 to primary data center 20 where it is stored in this encrypted form. Additionally, all authentication communication uses 448 bit Blowfish encryption. However, it should be understood that any other commercially available compression and encryption technology could be utilized. A compression library is utilized which utilizes a wrapping class that supports two main methods of compression and decompression. Specifically, the data files can be manipulated in memory (i.e. best for small files) or can be manipulated on disk (i.e. best for large files). When the file being compressed is small (e.g. less than 1 Mb) then it is more efficient to operate in memory rather than writing to disk. Compression is achieved by providing the compression algorithm with the appropriate memory pointer to the file data and datasize and by receiving back a pointer to the compressed file data and datasize and inversely for the decompression. In the case of decompression, memory is first allocated for the decompressed version of the data file.

At step (110), backup module 33 transmits the compressed/encrypted data blocks to the primary data center 20 for storage. Backup module 33 sorts data files so that priority is given to sending smaller data files (e.g. data files which are less than 1 Mb) to primary data center 20 which are able to complete in a shorter period of time. Then backup module 33 sends the larger data files (e.g. data files which are greater than 1 Mb) to primary data center 20. That is, the data backup process is broken into two parts, namely small data file backup and large data file backup. Small data files are defined as anything less than a predetermined file size (e.g. 1 Mb). The objective is to capture as much complete information as possible during what can be a small window of opportunity for data backup.

When backup source program 12 is running (i.e. not paused because of user keyboard or mouse activity), all small data files are backed up first. Once small data files have been backed up, data backup system 10 builds a queue of large data files. Periodically during the transfer (i.e. backup) of larger data files, backup module 33 will continue to scan for and process smaller data files. That is, as the large data files are processed, the backup is interrupted at predefined intervals, to look for small data files that might have changed. Upon restarting to process large files, the backup will continue where it left off without having to retransmit the initial portion of the file. Using this approach allows large backups to successfully traverse low speed intermittent network connections efficiently. A more detailed description of this data transfer process will be discussed.

At step (120), compressed and encrypted data blocks are received from backup module 33 by verification module 50. Verification module 50 first locks the data file to be verified. Then verification module 50 compares the internal CRC of the encrypted data blocks against the CRC stored in association with the data file in database cluster 29 to ensure that no data corruption has occurred in transit. It should be understood that any changes in a signature associated with a data block is closely monitored to guarantee quality of the data being backed up.

Each time a data block is transferred from workstation 16 or 17, it is verified by verification module 50 against an internal CRC to ensure that the data block has not been changed in transit. In addition, as will be discussed, verification module 50 operates on the data files located on the storage pool servers 28 one last time to ensure that no corruption has occurred. If verification is successful then a verification flag is set. If verification is not successful, then verification fails and corruption is detected, then appropriate errors are added to the backup log maintained by the server status module 62. Either way, verification module 50 then unlocks the data file and source device 7 will be caused to retransmit data At step (122), decompression/de-encryption module 52 of backup target program 14 decompress and de-encrypts data blocks using the decompression and de-encryption techniques that correspond to those utilized by compression/encryption module 42. At step (124), command module 53 stores data blocks within cache pool servers 26 and storage pool servers 28 (as appropriate as will be discussed) as they existed when data blocks were first transferred from the user's workstation 16 or 17. As will be described, data backup system 10 to reconstruct a given data file to various points in the past by recombining these modified data blocks with the original base data file that was originally sent and which has been backed up within cache pool servers 26 and storage pool servers 28. When a file exceeds the maximum number of versions, target update module 56 combines the original base file with all of the modified data blocks received to date to create a new up-to-date base data file as will be described.

Figure 11A:
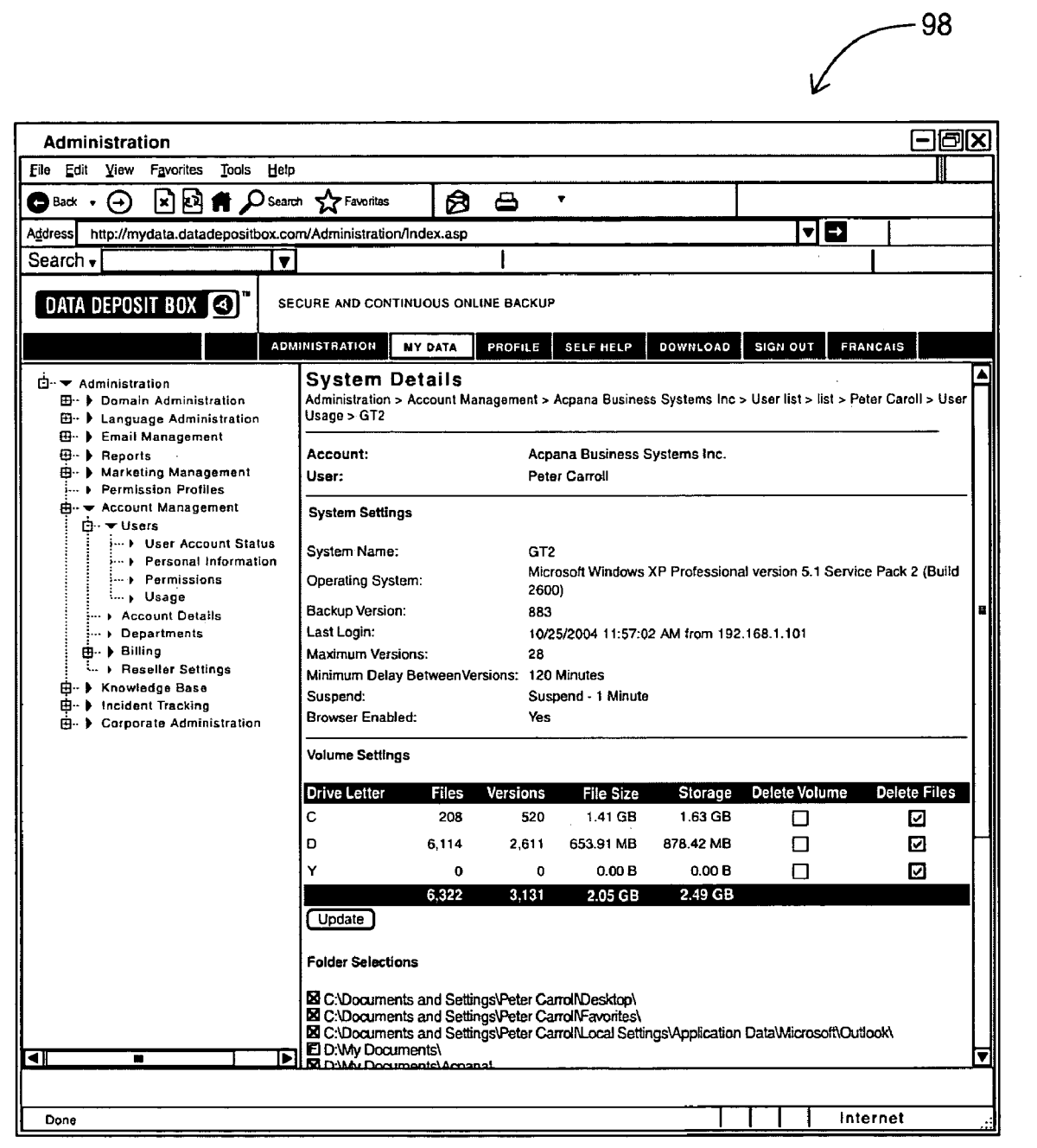
Figure 11B:

Backup status module 61 provides the system administrator associated with primary data center 20 with statistical information concerning user backups through screen interfaces 98 and 99 as shown in FIGS. 11A and 11B. Specifically, screen interface 98 (FIG. 11A) provides the system administrator with user usage statistics and screen interface 99 (FIG. 11B) provides the system administrator with corporate account usage statistics.

Figure 3:
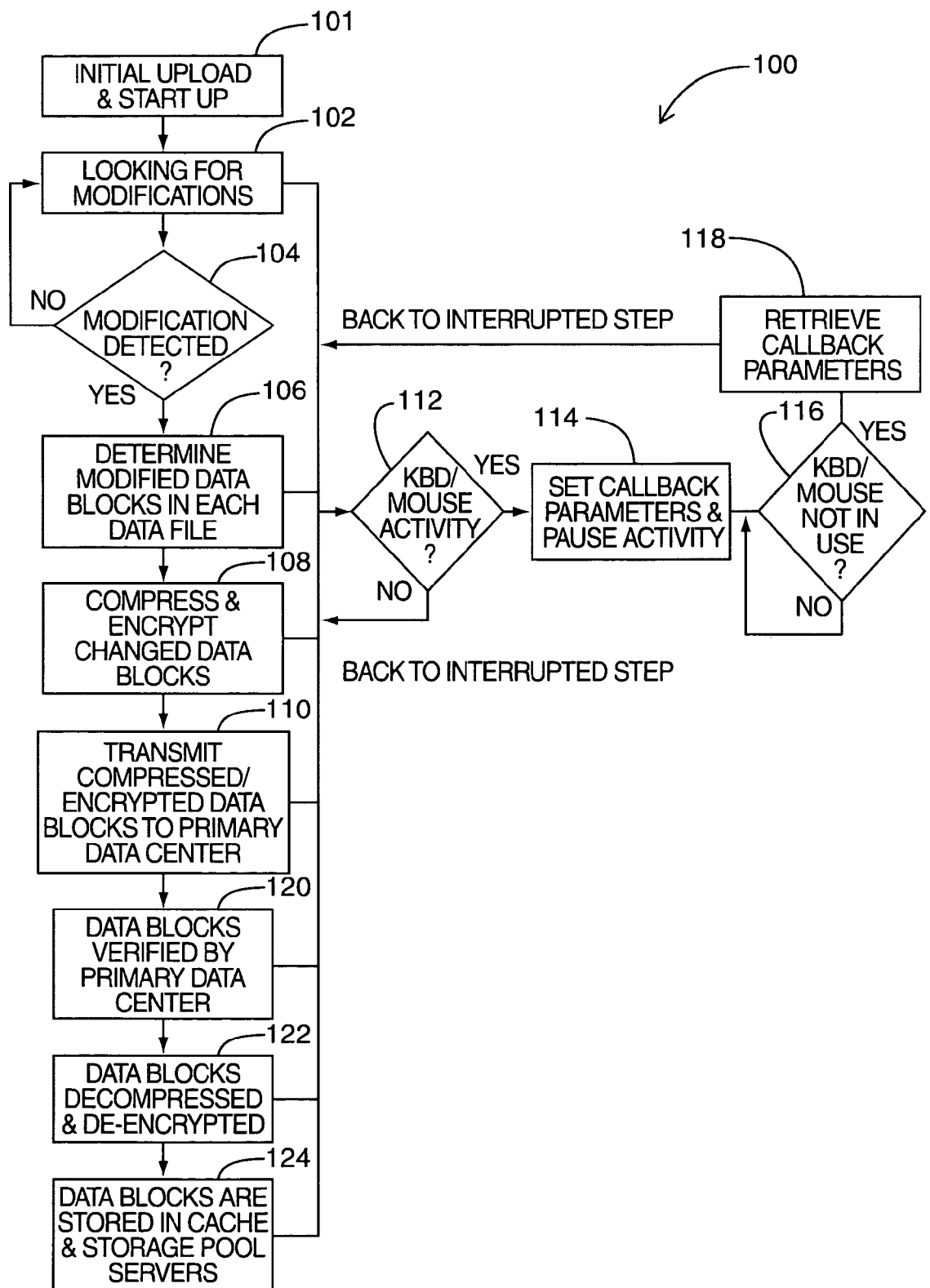
FIG. 3 is a flowchart illustrating the general process steps conducted by the data backup system of FIG. 1.

Backup source program 12 executes process general process steps 102, 104, 106, 108, 110, 120, 122, and 124 on a continuous and interruptible basis. Specifically, as shown in FIG. 3, at step (112) during all process steps executed by backup source program 12, interrupt module 34 monitors any user input activity (e.g. activation of PDA touch screen, workstation or PDA keyboard, workstation mouse activity, etc.) While only user keyboard and mouse input activity is specifically discussed, it should be understood that many other types of user input activity could be monitored by interrupt module 34 as needed. If interrupt module 34 does not detect any user keyboard or mouse activity for a predetermined period of time (e.g. 60 seconds) then backup source program 12 will automatically resume operation and return to the interrupted process step. For example, if data backup system 10 was backing up a large file when it was suspended then it will resume operation where it stopped. If at step (112), it is determined that the user is using the keyboard and mouse associated with workstation 16 or 17, then at (114), interrupt module 34 sets callback parameters and causes backup module 33 to pause activity.

Interrupt module 34 utilizes a number of functions to monitor workstation input devices and to set activity flags for the rest of backup source program 12 and backup target program 14. As discussed above, all operations within backup source and target programs 12 and 14 include a callback function that can be called to determine whether the operation should abort. If so, then the abort flag is set and the function immediately returns. Log levels are used to capture the details of any compression event and the log levels can range from OFF to LEVEL X. Log events ensure that the event level is higher than the logging level and then calls the callback function to perform the logging. If an event occurs which has a corresponding log event, and that log event is defined as a level X event (i.e. very detailed and verbose logging), if the users logging level is set to level Y (i.e. low) and the level X event log entry will be skipped. Interrupt module 34 uses the following functions: "Install_Hooks( )", "Remove_Hooks( )", "Set_Hook_Type( )", "GetActivity", "SetActivity", and "Last Error". "Install_Hooks( )" is used to mark where processes should be restarted when input device activity ceases again. "Remove_Hooks( )" is used to signal that the hooks have been removed. "Set_Hook_Type( )" allows for the specific hooks to monitor keyboard, mouse or both. "GetActivity" is used to find out whether there has been any activity based on a particular hook type. "SetActivity" is used to clear the activity flag after activity has been acknowledged. "Last Error" is used to return any relevant error information for display in an appropriate error usage log. Backup source programs 12 calls InstallHooks( ) at startup and RemoveHooks when exiting. While monitoring, the program calls GetActivity to see if there has been any user activity. The program uses SetActivity to reset the activity flag, so the next check will be guaranteed to be new activity (i.e. generated after the last check). Callback functions check to see if the activity flag has been set to determine if they should cause the current operation (i.e. compressing, encrypting, sending, etc) to pause.

This ensures that the user is not inconvenienced by the backup process conducted by data backup system 10 and that backup source program 12 can resume its processing once user stops using keyboard and/or mouse for a predetermined period of time. The objective of the interruptability feature is to enable interruption at any point in the client backup process and resumption at a later time without losing any of the work completed at the point of interruption. In order to achieve this objective, all classes within the software support a callback function. Each method in the class alters its processing sequence depending on the return code of the callback function. If the callback indicates that the function should pause, all required state information is saved and the function immediately returns. The state information is restored once the function is resumed. Callback also facilitates a client throttle of bandwidth and CPU processing by allowing "device sleeping" to occur at any point during processing.

At step (116), interrupt module 34 continues to monitor user keyboard and/or mouse activity and after a pre-determined period (e.g. 60 seconds) after user keyboard and/or mouse activity stops at step (118), callback parameters are retrieved and backup module 33 resumes its activity by returning to the interrupted step. Similarly, if interrupt module 34 detects that the network connection between workstation 16 or 17 and primary data center 20 has dropped, interrupt module 34 will also cause backup module 33 to pause until the connection is re-established. Each time backup module 33 resumes its activity, backup module 33 scans for small files (e.g. less than 1 Mb) giving them priority before continuing where it left off with large files. This approach allows large backups to successfully traverse low speed intermittent network connections efficiently.

Figure 4A:
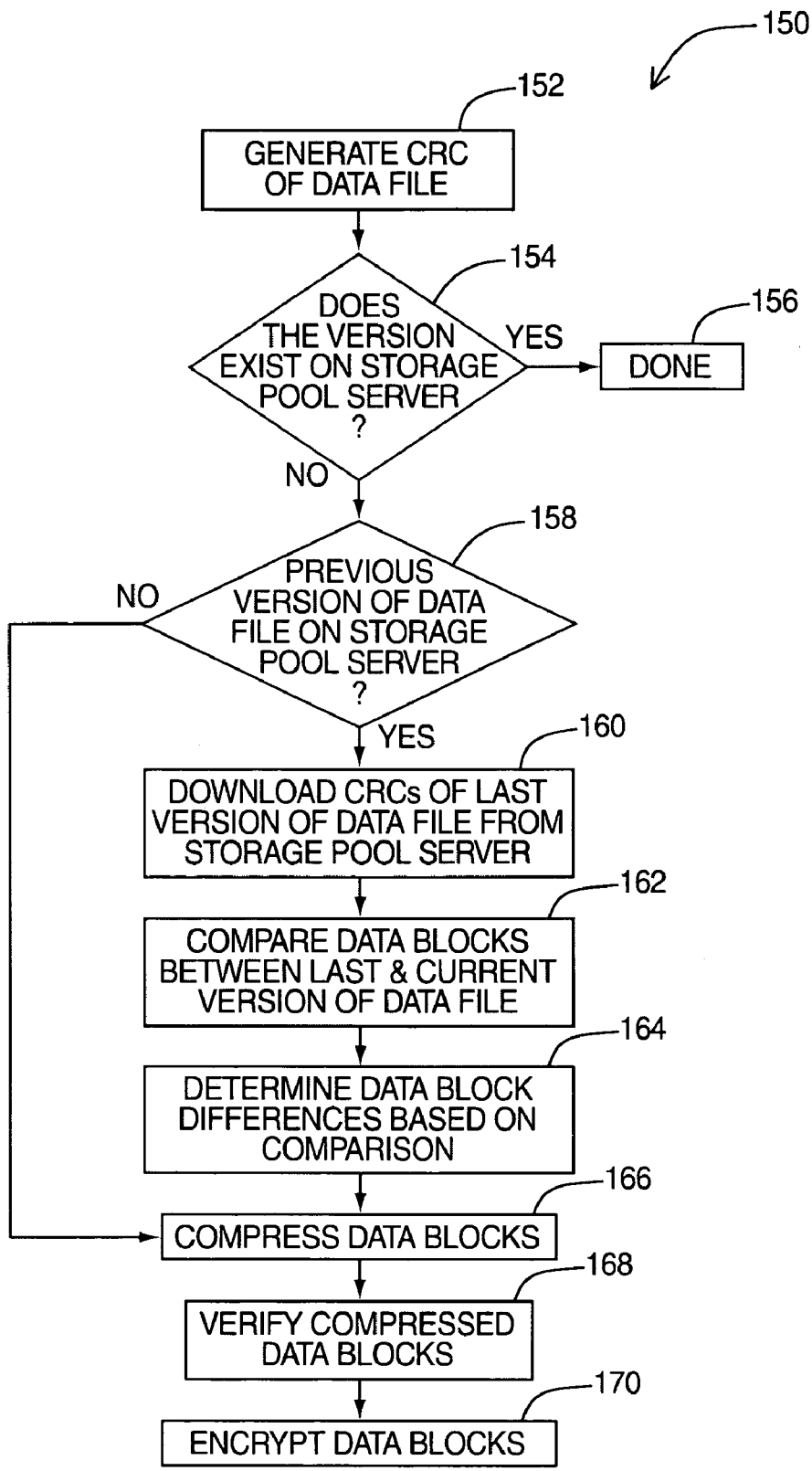
FIGS. 4A and B are flowcharts illustrating the process steps conducted by the backup source program run on the remote and networked workstations of the data backup system of FIG. 1.
Figure 4B:
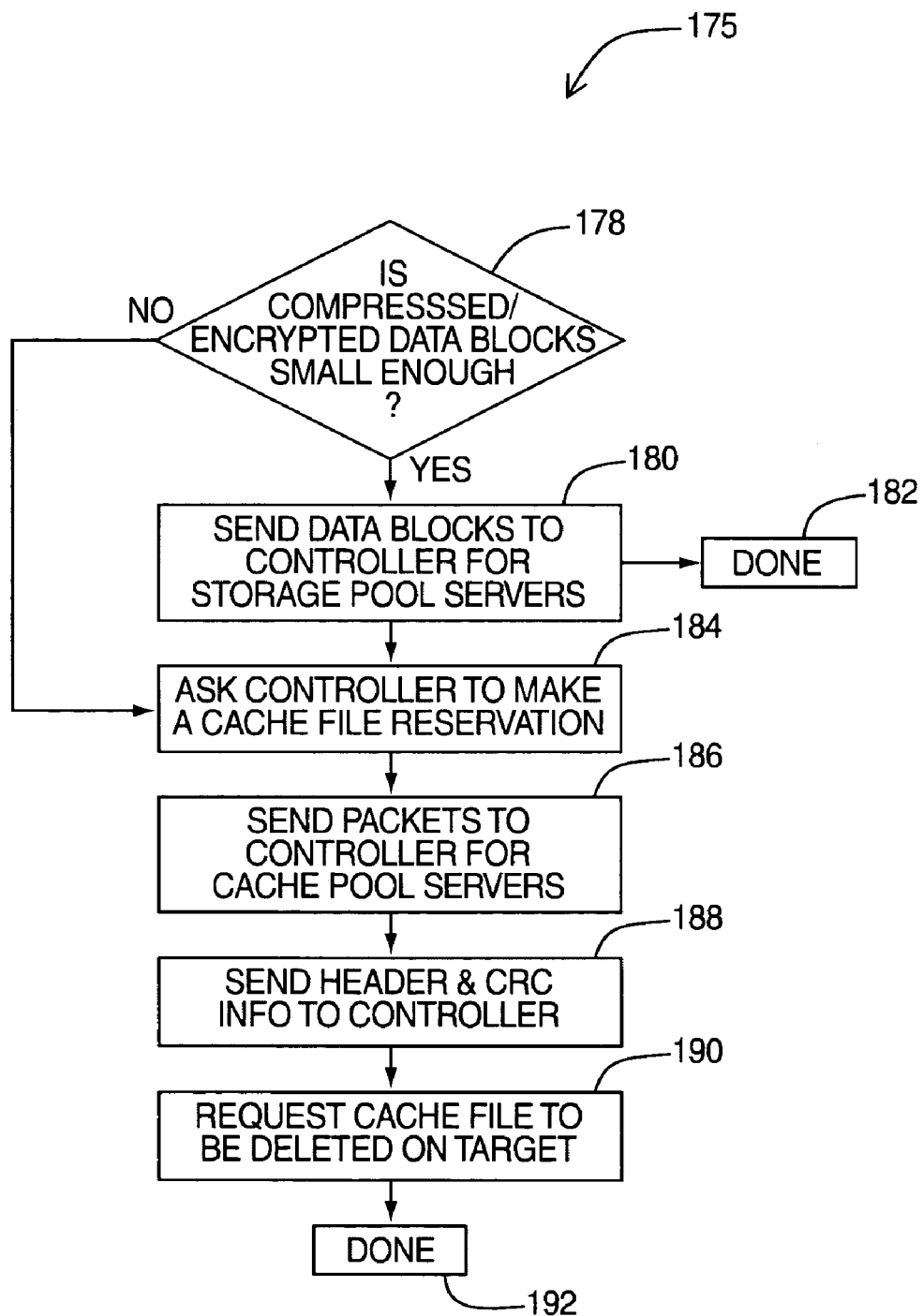

Reference is now made to FIGS. 1, 2A, and 4A and 4B, where FIGS. 4A and 4B are flowcharts that illustrating in more detail the process steps 150 and 175 conducted by the backup source program 12 installed on and executed by the remote and networked workstations 16 and 17 of data backup system 10. Specifically, at step (152), backup module 33 generates the CRC of the data file and at step (154) determines whether the current version of the data file exists on the storage pool servers 28. If it does, then at step (156), no further action is taken in respect of that particular data file.

If the current version of the data file does not exists on the storage pool servers 28, then at step (158), it is determined whether there is a previous version of the data file saved on the storage pool server 28. If so, then at step (160), the CRCs of the last version of the data file from the storage pool server 28. Then at step (162), backup module 33 compares the data blocks between the last and current versions of the data file. At step (164), backup module 33 determines the data block differences based on the comparison in step (162). If at step (158), there is no previous version of the data file stored on storage pool server 28, then at step (166), compression/encryption module 42 compresses all of the data blocks within data file. It should be noted that in the case where there is a previous version of the data file, only the different data blocks are compressed at this step. Next, at step (168), backup module 33 verifies the compressed data blocks and then at step (170), compression/encryption module 42 encrypts the compressed data blocks.

Figure 10A:
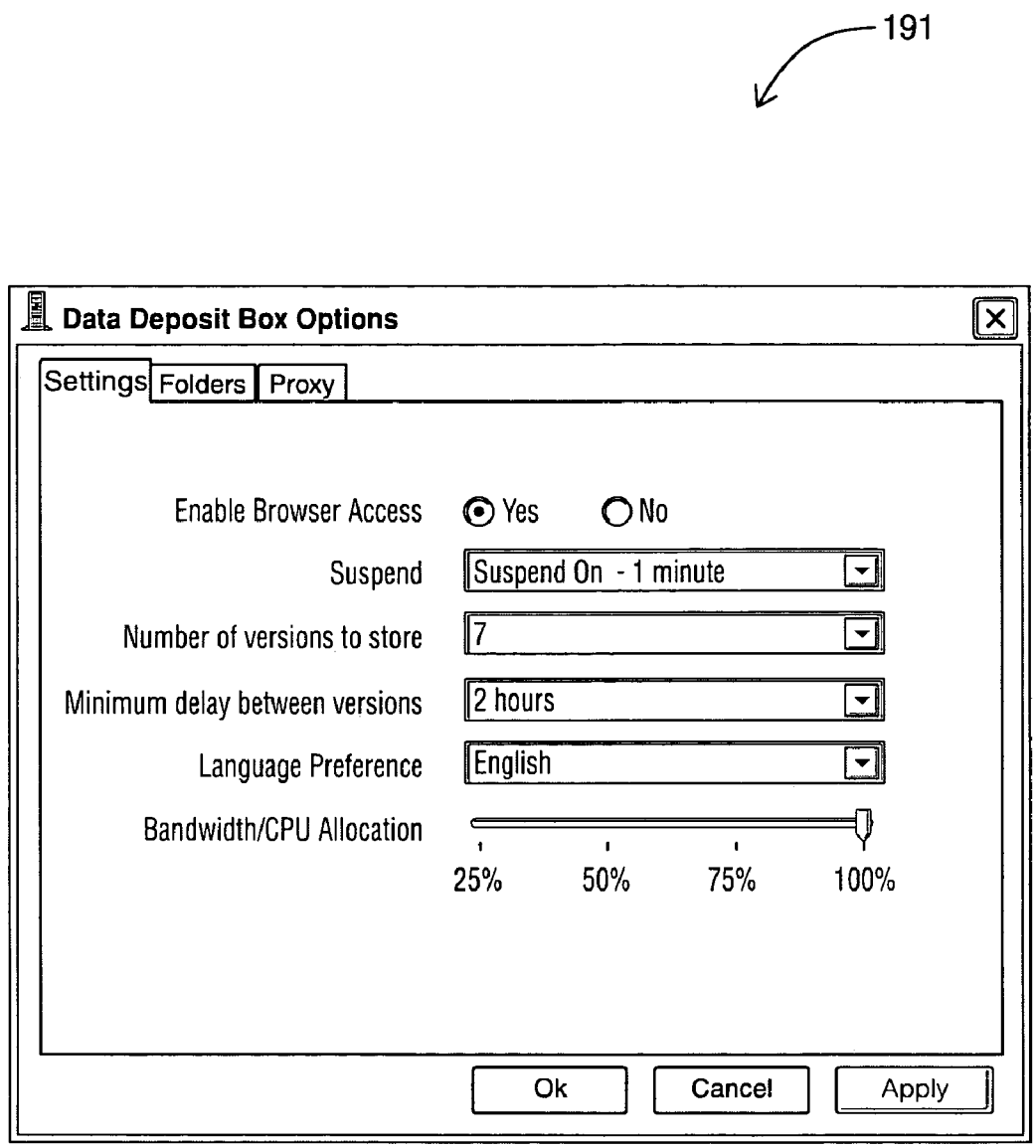
FIGS. 10A, 10B, 10C, 10D, 10E, 10F, 10G, and 10H are screen captures of a graphical user interface (GUI) generated on the screen of the remote and networked workstation of data backup system of FIG. 1.
Figure 10B:
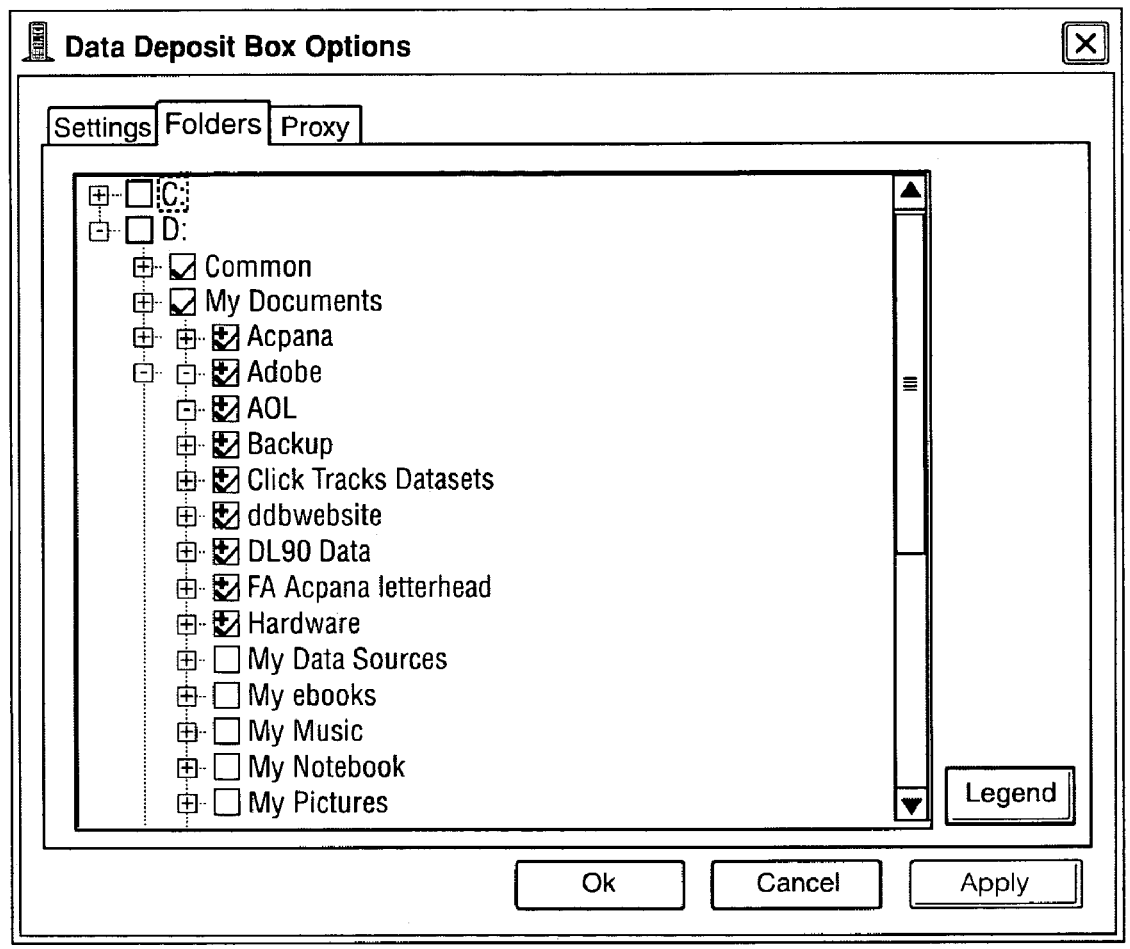
Figure 10C:
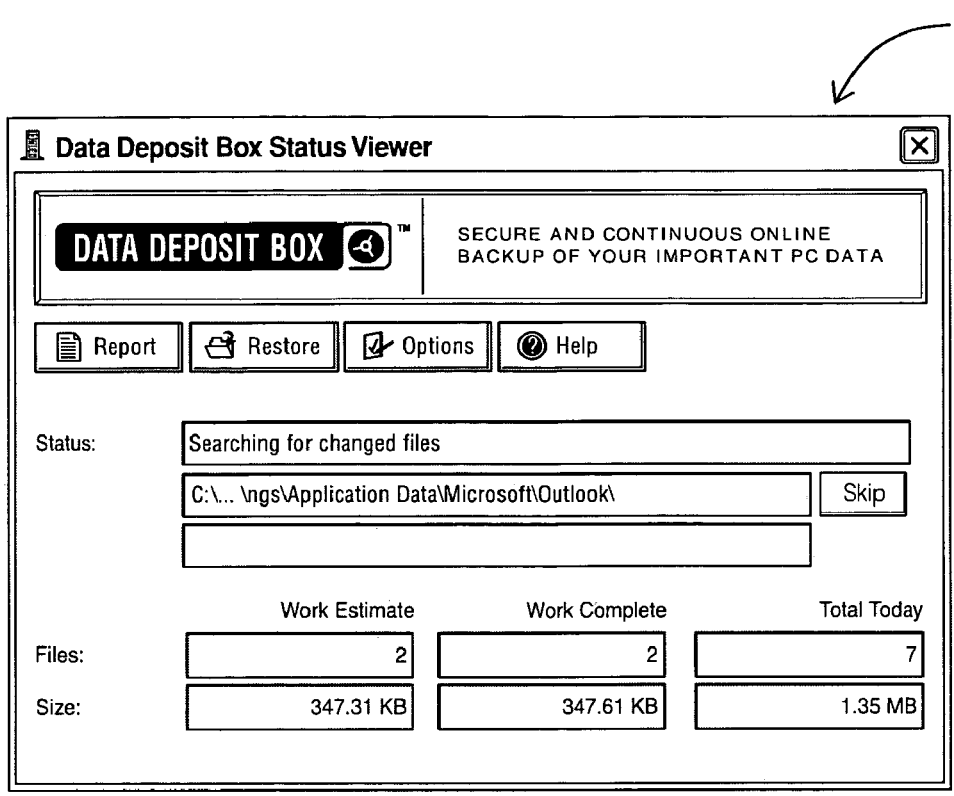
Figure 10D:
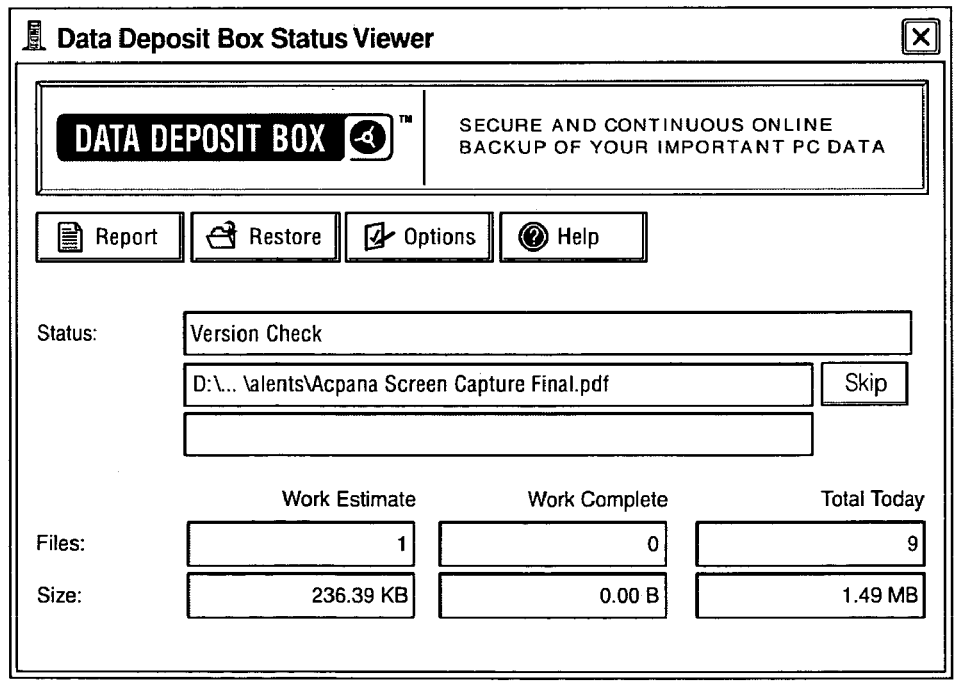
Figure 10E:
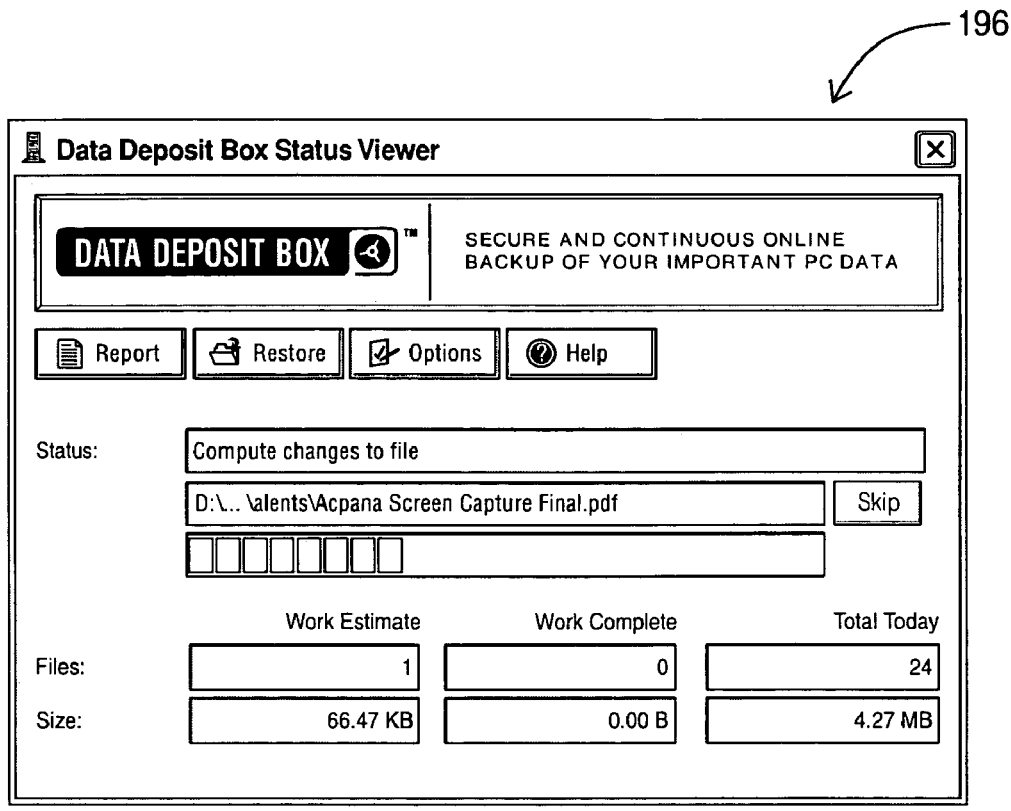
Figure 10F:
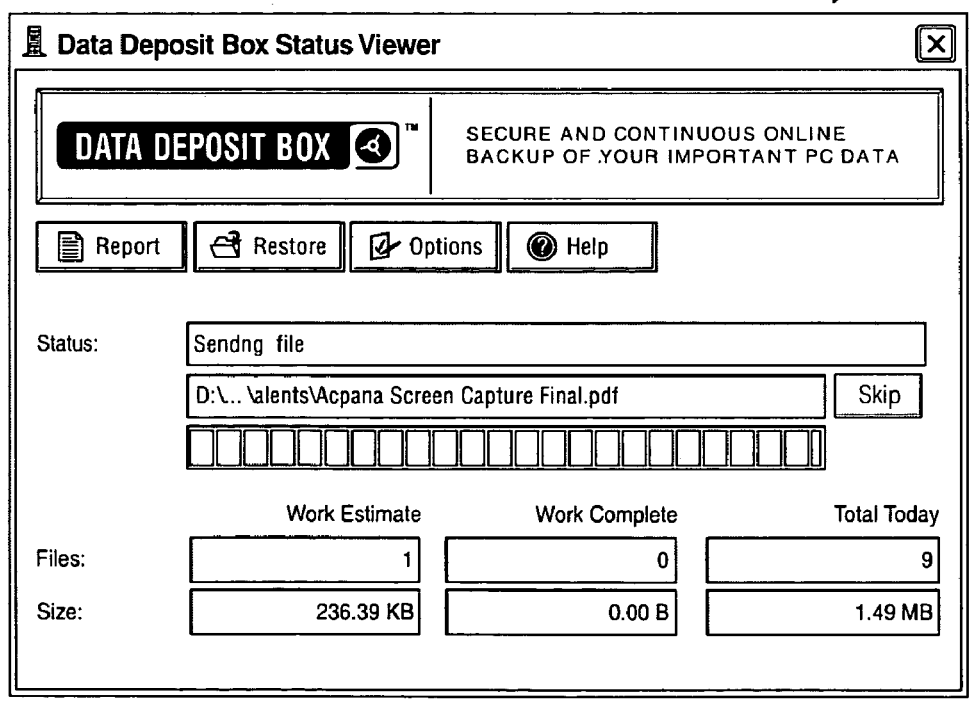

It should be understood that at any time, display module 38 provides user with a visual view of real time activity associated with data backup system 10. This includes real time progress of data files being backed up and totals for the day as shown in the example screen interfaces 194 (FIG. 10C), 195 (FIG. 10D), 196 (FIG. 10E), and 197 (FIG. 10F).

Figure 5:
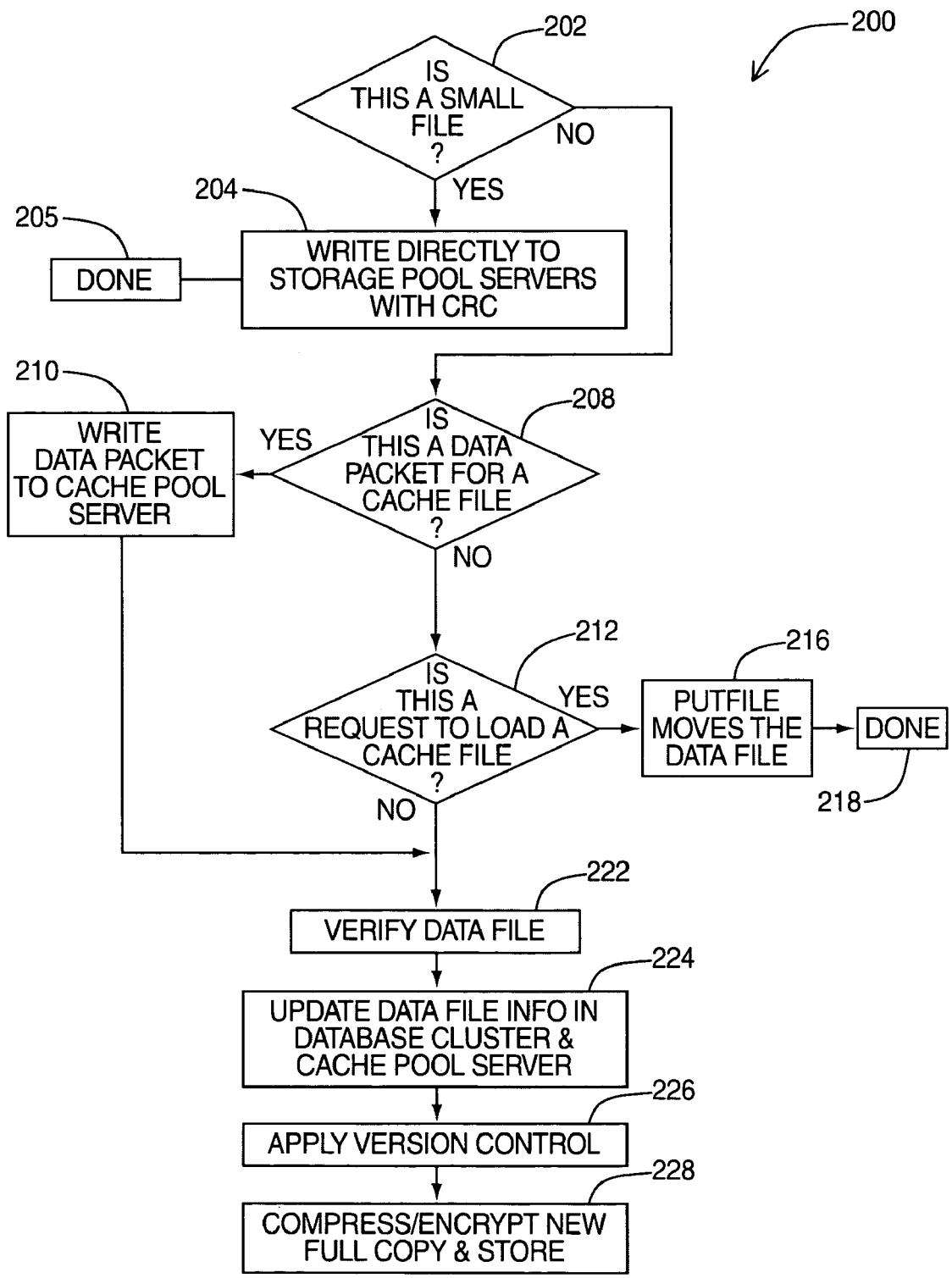
FIG. 5 is a flowchart illustrating the process steps conducted by the backup target program run on the controller of the primary data center of the data backup system of FIG. 1.
Figure 6:
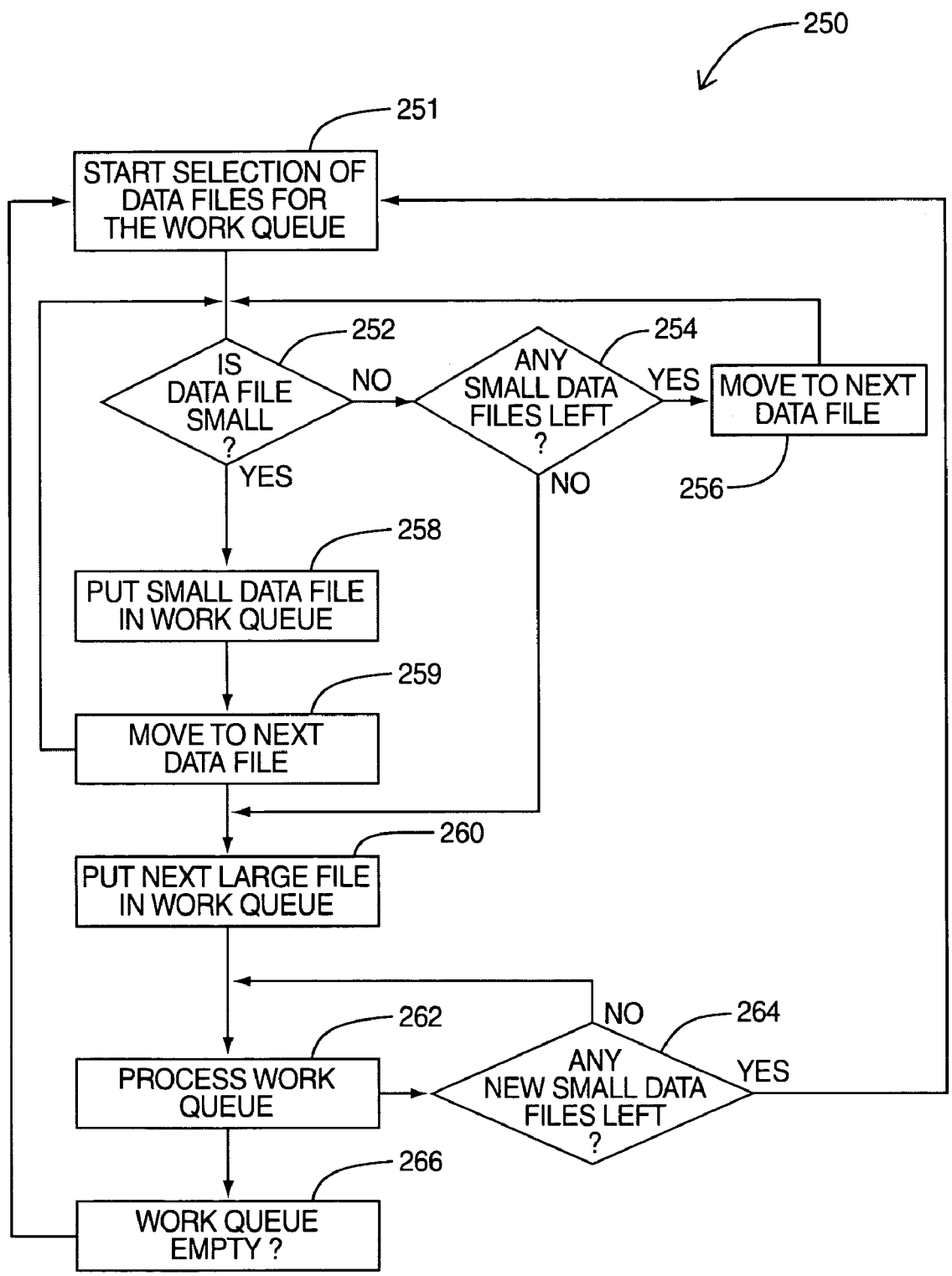
FIG. 6 is a flowchart illustrating the process steps conducted by the backup source program when selecting data files for transmission to the backup target program within the data backup system of FIG. 1.

Reference is now made to FIGS. 1, 2B, and 5, where FIG. 5 is a flowchart illustrating the process steps 200 conducted by the backup target program 14 installed on and executed by the controller 24 of the primary data center 20. Specifically, command module 53 executed within controller 24 receives a data packet from backup module 33. As previously discussed, command module 53 (FIG. 2B) controls the communication between backup module 33 (FIG. 2A) installed on workstation 16 and 17 and command module 53 installed within controllers 24 of primary data center 20. Command module 53 receives modified data blocks from workstation 16 or 17 in packet format and deposits the modified data blocks in the appropriate storage space.

Specifically, at step (202), command module 53 determines whether the received data is a data file that is less than a predetermined size (e.g. 1 Mb). If so, then command module 53 writes the data packet directly to the storage pool servers 28 with the CRC and at step (205), data backup is complete for the particular data file at issue. Verification and version control of the data file is then executed at steps (222) and (224) as will be described. If at step (202), the data received from backup module 33 is not a small data file, then at step (208), command module 53 determines whether it is a data packet for a particular cache file. If the data is a data packet for a cache file, then at step (210), command module 53 writes the data packet to the particular cache file stored within cache pool servers 26. Verification and version control of the data file is then executed at steps (222) and (224) as will be described.

If the data is a not data packet for a cache file, then at step (212), command module 53 determines whether backup module 33 has sent a request to load a cache file. If backup module 33 has sent a request to load the cache file then at step (216), putfile module 59 moves the completed data file from the cache pool server 26 into an appropriate location in the storage pool servers 28. Since data file transfer is then complete for the data file at issue, at step (222) data file is subjected to final verification using its internal CRC. If the data file is not verified, appropriate errors are generated on the backup log by backup status module 61. Accordingly, each time a data packet is received or a data file is transferred, the data packet or data file is verified against its internal CRC to ensure that no data was changed in transit over communication network 15.

If the data file is verified then, at step (224), command module 53 updates appropriate records (i.e. data file and cache tables) stored in database cluster 29 to reflect that modified data blocks have come in for a particular data file. Small data blocks for backup that fit within a single packet are directed to their final location on a storage pool server 28. Packets that associated with a larger multi-packet file are appended to a temporary file on a cache pool server 26 until an updated data file is complete.

Finally, at step (226), version control module 54 first locks the data file at issue. Version control module 54 then cycles through the various versions stored in storage pool servers 28 to determine the last version to keep. The last version is the full copy of data file. Then version control module 54 builds a new full version of the last/oldest copy of the data file. Version control module 54 also runs against all of the versions of the data file available and compares the available versions to the user configured maximum version number (as determined by source settings module 44 discussed above). When the version number associated with a data file exceeds the user-defined version maximum, version control module 54 take the base data file stored in storage pool servers 28 and applies all of the saved modified blocks in storage pool servers 28 to create a new base data file. At step (228), the new full copy of data file is compressed and encrypted and stored in storage pool server 28 and older versions of the data file are deleted. Finally, Version control module 54 unlocks the data file.

Various server administrative and clean-up operations are run periodically in the background. For example, cache data files that are no longer in use are deleted at a low priority. Also, when a data file is deleted from the storage pool servers 28, the data file is not immediately deleted. Instead, command module 53 update database cluster 29 to reflect the deletion and the delete request is put into a work queue. Again, the delete request work queue is run at a low priority to perform the actual deletion.

Also, data backup system 10 can be configured to implement a second copy of file data, possibly in a physically separate data center. Replication module 65 (FIG. 2B) can be configured to run in a second data center. Replication module 65 can be configured to read the data file info table stored in database cluster 29 and to make a copy of each data file on a second copy server (either within the same data center or in a different data center). Replication module 65 only runs when the verify and delete queues are empty to ensure that the replication module 65 does not attempt to transfer a data file that is corrupt or is slated for deletion. As with the other processes discussed above, replication module 65 runs continuously to ensure that storage pool servers 28 remain synchronized.

It has been observed that by implementing target device 9 as a redundant server controller configuration, substantial benefits can be achieved. Initially a first and second server configuration was used with replication techniques. It was found that the second server was not busy as the first server (a 30%-70% split). However, when data backup system 10 is implemented using primary and secondary servers configured to operate as a processing pair, substantial load-sharing results. Such a configuration provides good failover functionality with the secondary server being able to automatically take over in the case where the primary server fails.

Referring now to FIGS. 1, 2A, 2B, 6, FIG. 6 illustrates the specific structure workings of the data file and data block selection for transmission process conducted by backup module 33 will be discussed in more detail.

At step (251), backup module 33 obtains the compressed and encrypted data files from compression/encryption module 42 and starts selection of compressed and encrypted data files for insertion into the work queue. The size of the data files that is considered is their size prior to compression/encryption. The determination is made as to whether a data file is small or large. At step (252), backup module 33 considers whether a particular data file (uncompressed) is less than a predetermined size (e.g. 1 Mb). If so, then at step (258), backup module 33 puts the small data file in the work queue. At step (259), the next data file is considered and at step (251), selection of data files continues.

At step (252), it is again determined whether the data file is less than a predetermined size. If not, then at step (254), it is determined whether there are any small data files left. If so, then at step (256), the next data file is considered and at step (252) it is again determined whether the data file is small. If there are no small data files left at step (254), then at step (260), the next large file is inserted into the work queue. At step (262), the work queue is processed and periodically (e.g. every 5 minutes) at step (264), it is determined whether there are any new small data files that have been generated. If so, then at step (251) the selection process begins again so that the smaller data files are inserted into the work queue. Also, at step (266), it is determined whether the work queue is empty and if so then at step (251) the selection process begins again.

Figure 7:
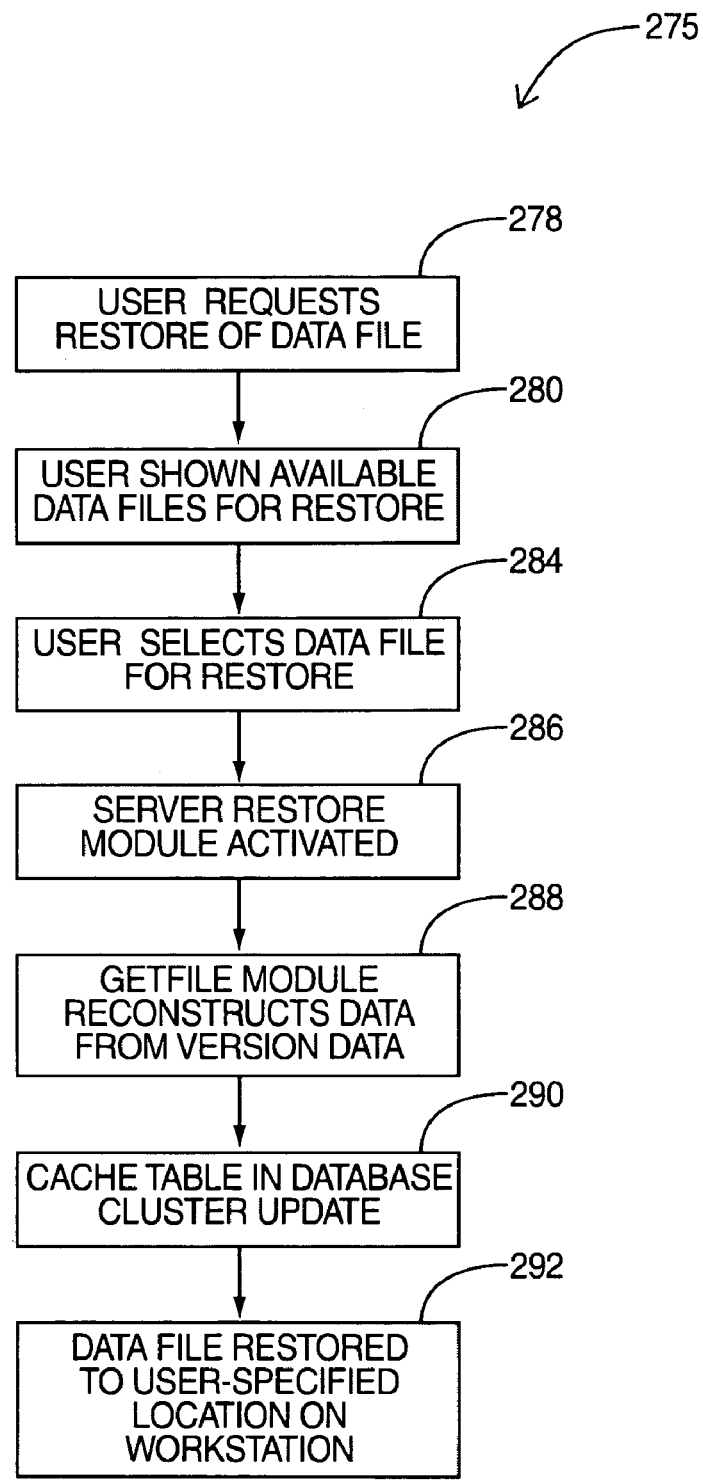
FIG. 7 is a flowchart illustrating the process steps conducted by the backup source and target programs when restoring data files within the data backup system of FIG. 1.
Figure 8:
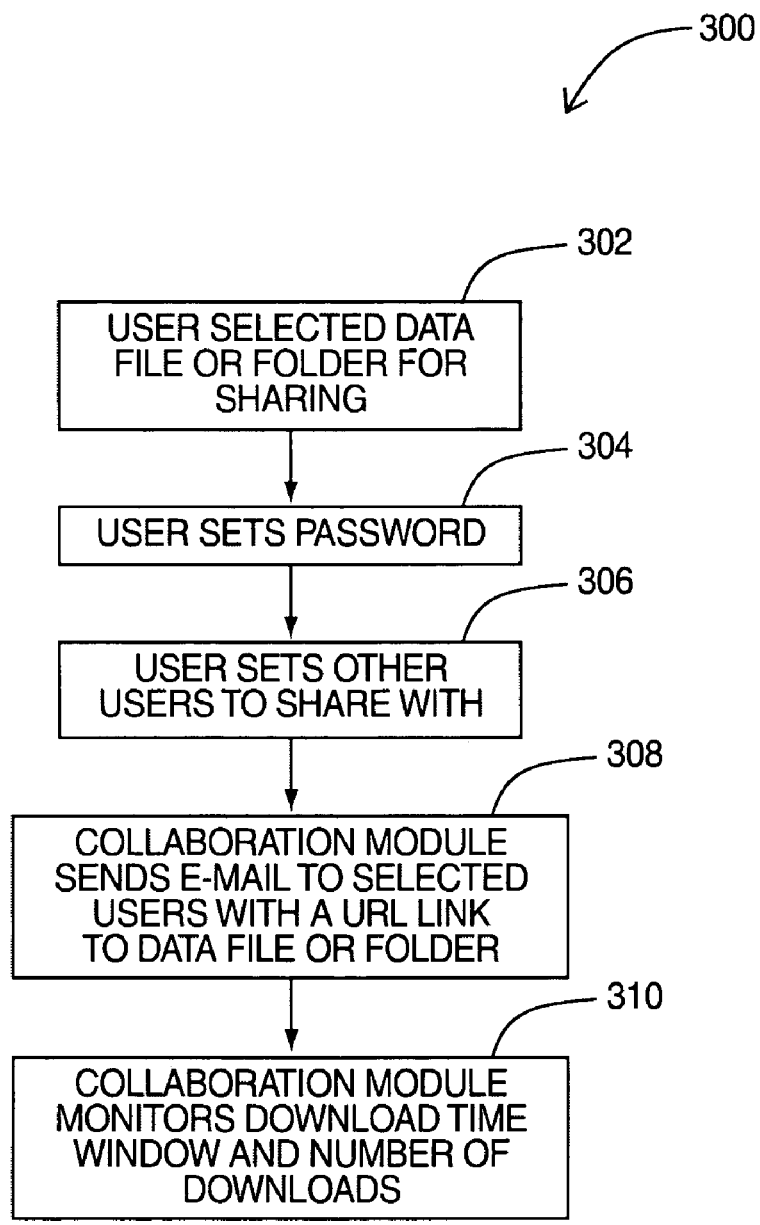
FIG. 8 is a flowchart illustrating the process steps conducted by the backup source and target programs when providing filing sharing of data files between users within the data backup system of FIG. 1.
Figure 9:
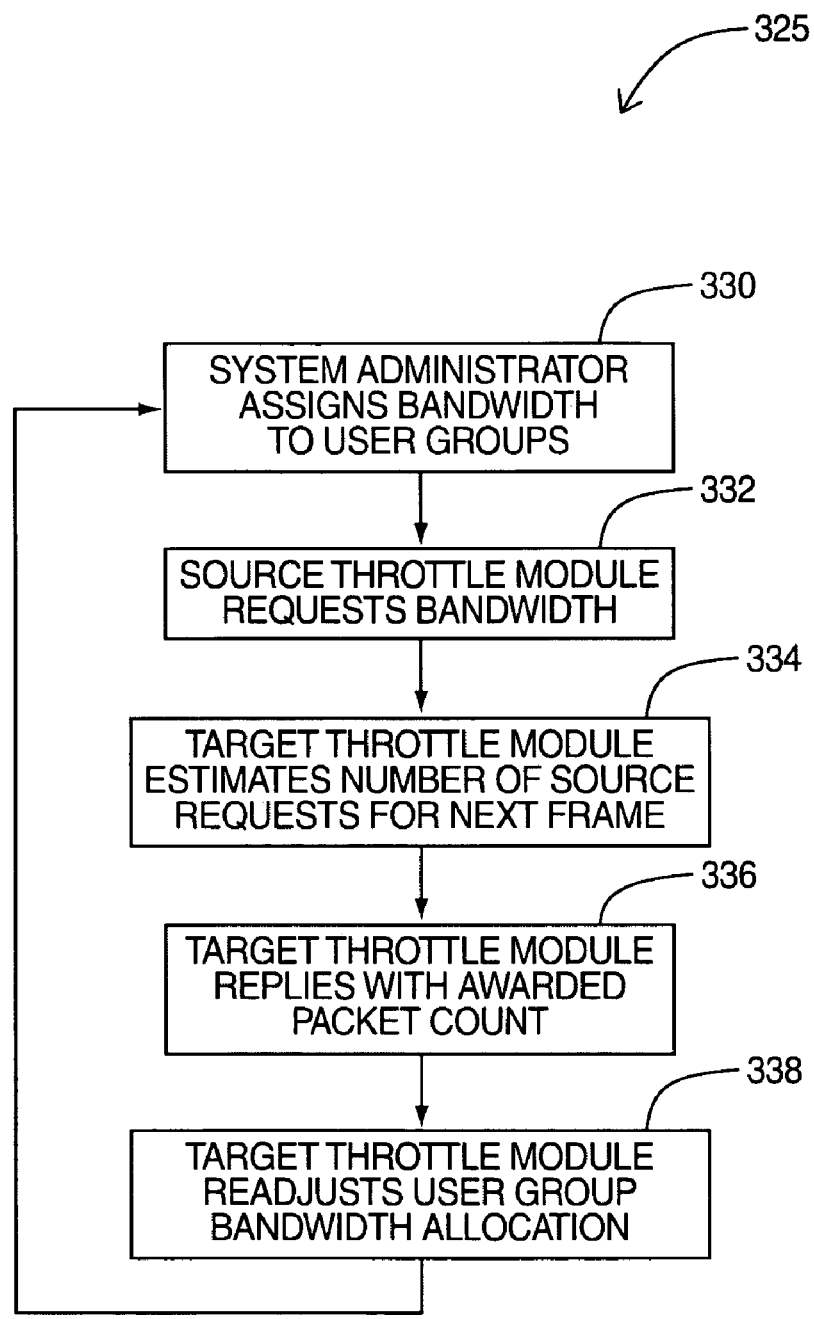
FIG. 9 is a flowchart illustrating the process steps conducted by the backup source and target programs when providing users and system administrator with the ability to throttle bandwidth utilization within the data backup system of FIG. 1.
Figure 10G:
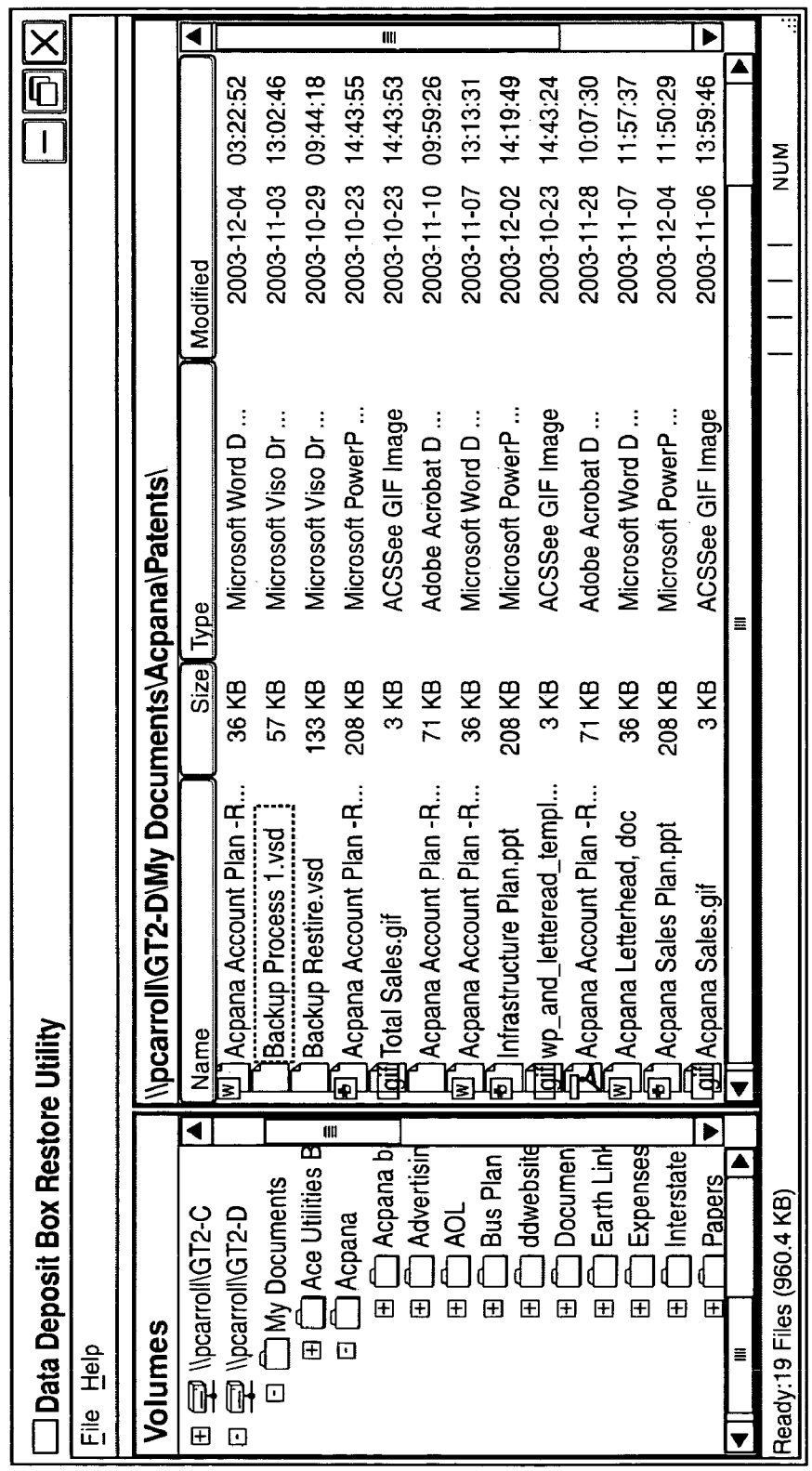
Figure 10H:
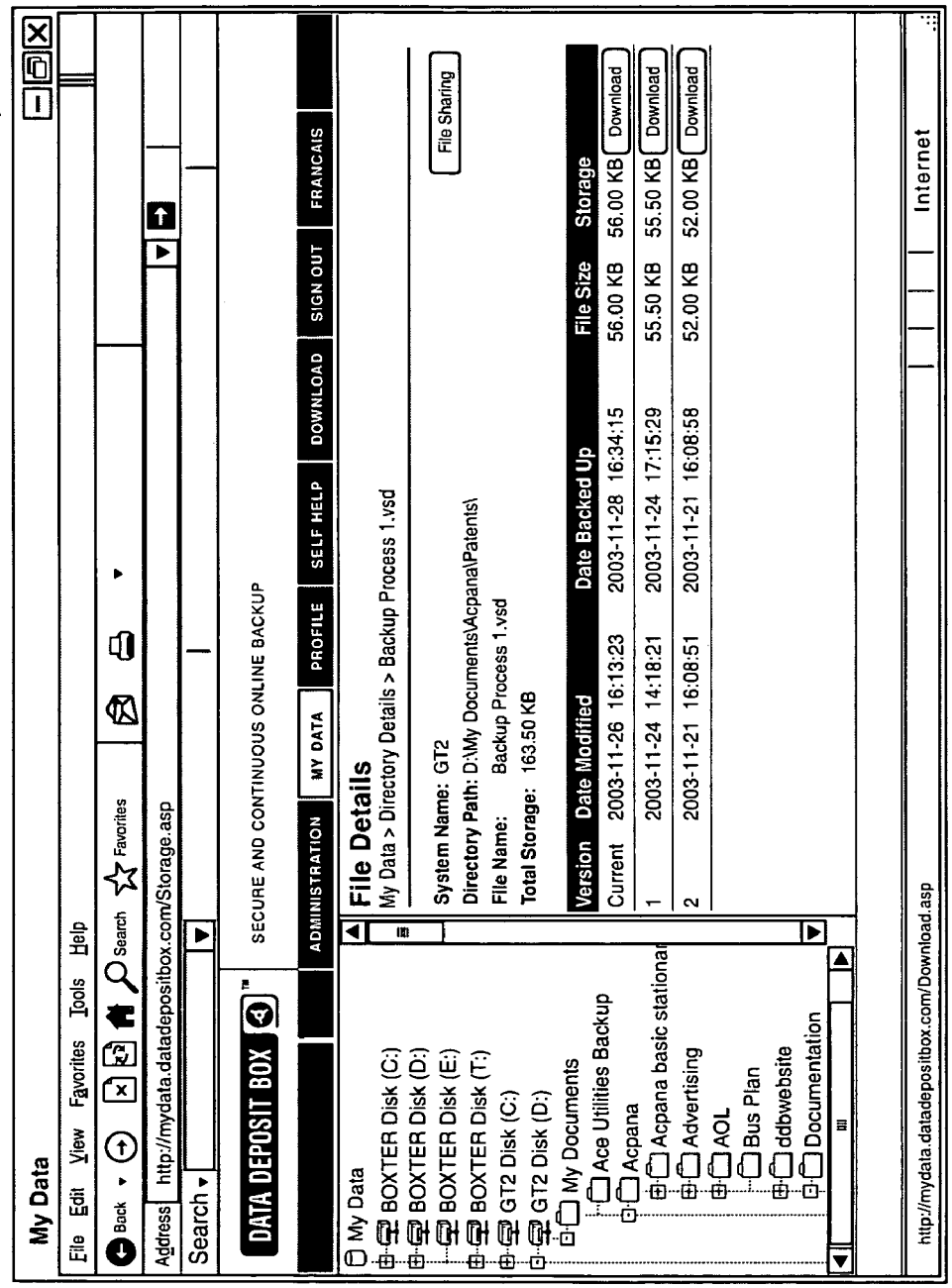

Referring now to FIGS. 1, 2A, 2B, and 7, where FIG. 7 is a flowchart illustrating the process steps conducted by backup source and target programs 12 and 14 when restoring data files within data backup system 10. At step (278), a user wishes to restore a data file. At step (280), backup module 33 (FIG. 2A) instructs restore module 40 and display module 38 to provide the user with a visual representation of the available files. It is preferred for the available files to be displayed to the user in a tree format that displays all volumes and allows the user to restore an individual file or an entire directory tree (i.e. file folder). The example screen interface 198 (FIG. 10G) illustrates what display module 38 provides to a user of a networked workstation 17. The example web screen interface 199 (FIG. 10H) illustrates what is provided by display module 38 to a user of a remote workstation 16. After selecting a data file they wish to restore from the data file tree at step (284), source restore module 40 at step (286) sends a request to target restore module 58 server to take the base data file currently in memory in storage on pool servers 28 and to utilize the modified data blocks also in stored on stored pool servers 28 to recreate the version of the data file that was selected by the user.

Specifically, at step (288), when a restore is requested by a user, target restore module 58 uses getfile module 63 to reconstruct the data file from version data stored in the storage pool servers 28 and deposit it in the cache pool. At step (290), the data file is verified and the cache table is updated. At step (290), the cache table in database cluster 29 is updated and the controller will transmit the restored data file to the source restore module 40 as compressed and encrypted data packets. At step (292), the data file is then restored to a user-specified location on remote or networked workstation 16 or 17. In the case of a web restore, getfile module 63 will reconstruct the data file and deposit it on the web server 22 for user to retrieve.

Restoration of multiple files is similar in that the user uses source restore module 40 to select the data files that they wish to recreate. Target restore module 58 will then take each base data file and utilize the modified data blocks also in stored on stored pool servers 28 to recreate the version of the data files that were selected by the user. The data files are then restored to a user-specified location on the remote or networked workstation 16 or 17. It should be understood that it is also possible to provide the user with a web interface to the user's data so that they can restore data files on a workstation which does not have the backup source program 12 installed.

Referring now to FIGS. 1, 2A, 2B, and 8, FIG. 8 is a flowchart illustrating the process steps (300) conducted by the backup source and target programs 12 and 14 when providing collaborative filing sharing of data files between users within the data backup system 10. At step (302), collaboration module 69 provides the user through display module 38 with the option of clicking on a data file or folder and flagging the data file or folder as being sharable with other users. At step (304), the user sets a password on that data file or folder and at step (306), the user provides the e-mail addresses of the other users that they wish to share the data file or folder with. At step (308), collaborative module 69 (FIG. 2B) sends an e-mail to those selected users with a URL that links back to the data file stored within storage pool servers 28. At step (310), collaborative module 69 retains controls over the process by instituting a window of time for data file or folder availability and a maximum allowed number of downloads. Users may also create a login name and password whenever they share a file publicly. When a user shares a data file or folder with another user, the only information available to the other user is that which has been shared. The other user has no other access to the users information or data files.

Referring now to FIGS. 1, 2A, 2B, and 9, FIG. 9 is a flowchart illustrating the process steps (325) conducted by the backup source and target programs 12 and 14 when providing a throttling service within the data backup system 10. Specifically, source throttle module 47 (FIG. 2A) allows users to control the amount of bandwidth used by backup source program 12 on their workstation. Also, target throttle module 67 (FIG. 2B) allows system administrators to control the total bandwidth used by all users and allows them to allocate bandwidth by subnet and schedule increases and decreases of allocations depending on such facts as time of day, etc. Target throttle module 67 regulates bandwidth usage by regulating the amount of bandwidth that is provided to workstation 16, 17 for backup transmissions.

Target throttle module 67 uses a sliding window to record and estimate backup traffic patterns. Backup traffic includes the number of users, the average request size and the volatility of these numbers. Specifically, at step (330), the system administrator assigns each group of users or subnet a total bandwidth capacity for all users in that user group or subnet. At step (332), source throttle module 47 sends a request for bandwidth for data file backup to target throttle module 67. At step (334), target throttle module 67 estimates the number of client requests in the next frame of data that will be provided to primary data center 22 based on the last frame of data and the volatility of the client request variable. The estimate of the number of client requests for the next frame of data incorporates feedback from the previous estimate as compared with actual requests as well as information regarding the number of client requests declined or reduced due to lack of available bandwidth. At step (336), target throttle module 67 replies to workstation 16 or 17 with an awarded data packet count and a duration after which the client can request additional bandwidth. At step (338), target throttle module 67 readjusts it's user group bandwidth allocation and then receives the next source throttle module request at step (332). The bandwidth allocation can be tied to a more real time congestion device to throttle subnets that may be experiencing high levels of traffic.

The objective of target throttle module 67 is to allocate 100% of its allotted bandwidth and reject 0% of requests. Target throttle module 67 monitors its 'estimated' requests, awards, rejects as compared to 'actual' requests, awards and rejects and uses this feedback to adjust future estimates. This built in error correction compensates for dynamic volatility. The sliding window is preferably comprised of 10 frames. Each frame is preferably 6 seconds in duration. During low bandwidth times, the frame size can be increased. The evaluation and awards calculations must be performed very quickly to minimize the computational overhead associated with the operation of target throttle module 67. The overhead will be adjusted for in the error correction.

As discussed, data backup system 10 continuously monitors specified folders on the workstation looking for changes. When a change occurs, backup module (FIG. 2A) compares the new data file to the last version of the data file that was backed up. Backup module 33 extracts only the data that has changed, compresses it, encrypts it, and transfers it to primary data center 20 for storage. As previously discussed, other solutions often involve a scheduled backup starting at a specific point in time. In such a case, a large block of data is assembled and transported across a local area network to a server for storage. Because large chunks of data must be transferred at scheduled times, they do not function well over a slow or intermittent internet connection. To solve this problem, data backup system 10 transfers only the modified data blocks associated with changes in data files on a continuous basis and favours the transfer of smaller data blocks over larger data blocks. In this way, data synchronization of a workstation to a central backup server can be achieved over a local area network or over a relatively low speed Internet connection.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A data backup system for backing up a data file comprising:
   (a) a source device having a source processor and an input device, the source processor being configured to:
      (i) determine whether the data file has been modified at the source device;
      (ii) upon determining that the data file has been modified at the source device, determine at least one modified data block associated with the modification to the data file;
      (iii) transmit the at least one modified data block from the source processor over a communication network;
   (b) a target device connected to the source device over the communication network, said target device having the target processor configured to:
      (iv) receive said at least one modified data block from said source processor over the communications network;
   (c) said source processor and said target processor also configured to determine if the input device is active simultaneously with at least one of (i), (ii), (iii), and (iv), and if so, interrupt at least one of (i), (ii), (iii), and (iv), until the input device has been inactive for a predetermined period of time.

2. The system of claim 1, wherein said target device is associated with a database, said target processor also configured to:
   (v) use the modified data blocks to construct the data file; and
   (vi) store the data file on the database.

3. The system of claim 2, wherein the target processor is further configured to construct the data file from a previous version of the data file and said modified data blocks after a predetermined length of time has elapsed since the last transmission of data blocks.

4. The system of claim 2, wherein said target processor is also configured to construct a plurality of versions of the data file.

5. The system of claim 1, wherein said source processor is also configured to transmit data blocks associated with data files that are less than a predetermined size to the target device prior to transmitting data blocks associated with data files that are greater than said predetermined size to the target device.

6. The system of claim 1, wherein the source processor is also configured to delay transmission of data blocks after a predetermined length of time has elapsed since the last transmission of data blocks.

7. The system of claim 1, wherein the transmission in (iii) and the reception in (iv) of data blocks is controlled such that only a set amount of bandwidth is utilized for the transmission in (iii) and the reception in (iv).

8. The system of claim 7, wherein the set amount of bandwidth is determined on the basis of the historical characteristics of transmission in (iii) and the historical characteristics of reception in (iv).

9. A method for backing up a data file from a source device having a source processor and an input device to a target device having a target processor over a communication network, said method comprising:
   (a) determining whether the data file has been modified at the source device
   (b) upon determining that the data file has been modified at the source device, determining at least one modified data block associated with the modification to the data file;
   (c) transmitting the at least one modified data block from the source processor to the target processor over the communication network;
   (d) receiving said at least one modified data block from said source processor over the communications network;
   (e) determining if the input device is active simultaneously with at least one of (a), (b), (c), and (d), and if so, interrupting at least one of (a), (b), (c), and (d), until the input device has been inactive for a predetermined period of time.

10. The method of claim 9, wherein said target device is associated with a database and wherein the method further comprises:

(f) using the modified data blocks to construct the data file; and (g) storing the data file on the database.

11. The method of claim 10, further comprising constructing a plurality of versions of the data file and storing on the database.

12. The method of claim 9, further comprising transmitting data blocks associated with data files that are less than a predetermined size to the target device prior to transmitting data blocks associated with data files that are greater than said predetermined size to the target device.

13. The method of claim 9, further comprising delaying transmission of data blocks after a predetermined length of time has elapsed since the last transmission of data blocks.

14. The method of claim 9, further comprising constructing the data file from a previous version of the data file and said modified data blocks after a predetermined length of time has elapsed since the last transmission of data blocks.

15. The method of claim 9, wherein the transmission in (c) and the reception in (d) of data blocks is controlled such that only a set amount of bandwidth associated with communications network is utilized for the transmission in (c) and the reception in (d).

16. The method of claim 15, wherein the set amount of bandwidth is determined based on the historical characteristics of transmission in (c) and the historical characteristics of reception in (d).

17. A data backup system for backing up a data file comprising:
(a) a source device having a source processor and an input device, the source processor being configured to:
  (i) determine whether the data file has been modified at the source device
  (ii) upon determining that the data file has been modified at the source device, determine at least one modified data block associated with the modification to the data file;
  (iii) transmit the at least one modified data block from the source processor over a communication network;
(b) a target device connected to the source device over the communication network, said target device having the target processor configured to:
  (iv) receive said at least one modified data block from said source processor over the communications network;
(c) said source and target processors further configured, to:
  (v) control the transmission in (iii) and the reception in (iv) of data blocks such that only a set amount of bandwidth of the communications network is utilized for the transmission in (iii) and the reception in (iv).

18. The system of claim 17, wherein the set amount of bandwidth is determined based on the basis of historical transmission and reception information.

19. The system of claim 18, wherein said source processor and said target processor are also configured to determine if the input device is active simultaneously with at least one of (i), (ii), (iii), and (iv), and if so, interrupt at least one of (i), (ii), (iii), and (iv), until the input device has been inactive for a predetermined period of time.

20. The system of claim 17, wherein said target device is associated with a database, said target processor also being configured to:
(v) use the modified data blocks to construct the data file; and
(vi) store the data file on the database.

21. The system of claim 17, wherein the target processor is also configured to construct the data file from a previous version of the data file and said modified data blocks after a predetermined length of time has elapsed since the last transmission of data blocks.

22. The system of claim 21, wherein the target processor is configured to construct a plurality of versions of the data file.

23. The system of claim 18, wherein said source processor is also configured to transmit data blocks associated with data files that are less than a predetermined size to the target device prior to transmitting data blocks associated with data files that are greater than said predetermined size to the target device.

24. The system of claim 18, wherein the source processor is also configured to delay transmission of data blocks after a predetermined length of time has elapsed since the last transmission of data blocks.

25. A method for backing up a data file from a source device having a source processor and an input device to a target device having a target processor over a communication network, said method comprising:
(a) determining whether the data file has been modified at the source device;
(b) upon determining that the data file has been modified at the source device, determining at least one modified data block associated with the modification to the data file;
(c) transmitting the at least one modified data block from the source processor to the target processor over the communication network;
(d) receiving said at least one modified data block from said source processor over the communications network;
(e) controlling at the source device and the target device the transmission in (c) and the reception in (d) of data blocks such that only a set amount of bandwidth of the communications network is utilized for the transmission in (c) and the reception in (d).

26. The method of claim 25, wherein the set amount of bandwidth is determined based on the basis of historical transmission and reception information.

27. The method of claim 26, wherein said backup source module and said backup target module also determine if the input device is active simultaneously with at least one of (a), (b), (c), and (d), and if so, interrupt at least one of (a), (b), (c), and (d), until the input device has been inactive for a predetermined period of time.

28. The method of claim 26, wherein said target device is associated with a database, said backup target module when executed also causes the target processor to:
(f) use the modified data blocks to construct the data file; and
(g) store the data file on the database.

29. The method of claim 28, wherein the backup target module causes said target processor to construct the data file from a previous version of the data file and said modified data blocks after a predetermined length of time has elapsed since the last transmission of data blocks.

30. The method of claim 29, wherein the backup target module causes said target device to construct a plurality of versions of the data file.

31. The method of claim 26, wherein said backup source module causes said source processor to transmit data blocks associated with data files that are less than a predetermined size to the target device prior to transmitting data blocks associated with data files that are greater than said predetermined size to the target device.

32. The method of claim 26, wherein the backup source module causes said source processor to delay transmission of data blocks after a predetermined length of time has elapsed since the last transmission of data blocks.

* * * * *

UNITED STATES PATENT AND TRADEMARK OFFICE
CERTIFICATE OF CORRECTION

PATENT NO. : 7,401,194 B2
APPLICATION NO. : 11/003763
DATED : July 15, 2008
INVENTOR(S) : Timothy R. Jewell It is certified that error appears in the above-identified patent and that said Letters Patent is hereby corrected as shown below:

Column 5, lines 31 to 45, the sentences "First, backup module 33 can automatically find data folders that should be backed up (e.g. Outlook™ e-mail folders) and display them through display module 38 to user. The user will then be able to review the selected data files and add/delete the data files and folders as necessary. Second, backup module 33 can allow a user to come up with which data files/folders that they would like backed up. Backup module 33 operates on the basis that backups are intended for user data files only and not for a complete hard drive backup (e.g. including system files, printer driver files, applications, etc.) An example screen interface 193 (FIG. 10B) is provided to the user on which the user can make such selections. Source settings module 44 also allows the user to operate via a proxy server or on the basis of web browser access." has been changed to --For example, an example screen interface 191 (FIG. 10A) is provided to the user on which the user can specify the maximum number of versions to be saved (e.g. 10 or 50) to ensure that reasonable storage space is utilized within primary data center 20 for the user (FIG. 10A). Also, the user can specify the minimum age between versions of a data file (FIG. 10A). That is, a user can specify that when a new file is created it will not be backed up until it is at least "X" minutes old (i.e. until "X" minutes have elapsed since the last backup). This ensures that the number of versions being backed up is a meaningful number. It is also contemplated that if a data file has not been modified for a long period of time (e.g. 30 days), that all backed up versions of the data file are collapsed into the most current version. This is consistent with the desire to have a number of versions available for the user to return to a previous version in the case of an inadvertent mistake (i.e. parts of a data file are mistakenly erased).--.

Column 5, line 50 the phrase "Outlook e-mail folders)" has been changed to --Outlook™ e-mail folders)--, so that the line reads --Outlook™ e-mail folders), and display them through display--.

Column 16, line 4, claim 1, and column 17, line 42, claim 17, the word "the" has been changed to --a--, so that the lines read --communication network, said target device having a target processor--.

Column 16, line 7, claim 1, column 16, line 59, claim 9, column 17, lines 45 and 50, claim 17, and column 18, lines 29 and 33, claim 25, the word "communications" has been changed to --communication--.

Column 16, line 51, claim 9, and column 17, line 33, claim 17, the phrase "the source device" has been changed to --the source device;--.

UNITED STATES PATENT AND TRADEMARK OFFICE
CERTIFICATE OF CORRECTION

PATENT NO. : 7,401,194 B2
APPLICATION NO. : 11/003763
DATED : July 15, 2008
INVENTOR(S) : Timothy R. Jewell It is certified that error appears in the above-identified patent and that said Letters Patent is hereby corrected as shown below:

Column 17, line 48, claim 17, the phrase "configured, to:" has been changed to --configured to:--, so that the line reads --(c) said source and target processors further configured to:--.

Signed and Sealed this

Twenty-second Day of December, 2009

David J. Kappos
*Director of the United States Patent and Trademark Office*